(12) United States Patent
Kadowaki

(10) Patent No.: US 11,977,701 B2
(45) Date of Patent: *May 7, 2024

(54) SENSOR PANEL FOR DETECTING STYLUS SIGNAL SENT FROM STYLUS

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,423

(22) Filed: Oct. 17, 2022

(65) Prior Publication Data

US 2023/0030832 A1 Feb. 2, 2023

Related U.S. Application Data

(63) Continuation of application No. 17/529,063, filed on Nov. 17, 2021, now Pat. No. 11,507,223, which is a
(Continued)

(30) Foreign Application Priority Data

Oct. 3, 2017 (JP) .................................. 2017-193381

(51) Int. Cl.
*G06F 3/041* (2006.01)
*G06F 3/0354* (2013.01)
*G06F 3/044* (2006.01)

(52) U.S. Cl.
CPC ...... *G06F 3/04164* (2019.05); *G06F 3/03545* (2013.01); *G06F 3/04162* (2019.05); *G06F 3/0442* (2019.05); *G06F 3/0446* (2019.05)

(58) Field of Classification Search
CPC ................................................. G06F 3/04164
See application file for complete search history.

(56) References Cited

U.S. PATENT DOCUMENTS 10,152,163 B2 12/2018 Bytheway et al.
10,296,152 B2 5/2019 Weng et al.
(Continued)

FOREIGN PATENT DOCUMENTS

JP 2005-4732 A 1/2005
JP 2009-258935 A 11/2009
(Continued)

OTHER PUBLICATIONS

International Search Report, dated Nov. 6, 2018, for International Application No. PCT/JP2018/034767, 4 pages. (with English translation).
(Continued)

*Primary Examiner* — Chun-Nan Lin
(74) *Attorney, Agent, or Firm* — Seed IP Law Group LLP

(57) ABSTRACT

A sensor panel includes a detection area and is coupleable to an integrated circuit (IC) for detecting a position of an active stylus in the detection area. The sensor panel includes a plurality of first electrodes which are elongated and extending along a first direction in the detection area, wherein the plurality of first electrodes are arrayed along a second direction that is transverse to the first direction; a plurality of first routing traces associated respectively with the first electrodes and connected respectively to the first electrodes; and a plurality of first terminals associated respectively with the first routing traces and connecting the first routing traces to the IC. The first routing traces include extension lines formed in an area farther distanced from the first terminals along the second direction, than locations of junctions between the first routing traces and the first electrodes relative to the first terminals.

4 Claims, 13 Drawing Sheets

Related U.S. Application Data continuation of application No. 16/805,561, filed on Feb. 28, 2020, now Pat. No. 11,182,016, which is a continuation of application No. PCT/JP2018/034767, filed on Sep. 20, 2018.

(56) References Cited

U.S. PATENT DOCUMENTS

| | | |
|---|---|---|
| 10,782,836 B2 | 9/2020 | Kadowaki |
| 11,347,343 B2 | 5/2022 | Yan et al. |
| 2004/0246240 A1 | 12/2004 | Kolmykov-Zotov et al. |
| 2009/0262095 A1 | 10/2009 | Kinoshita et al. |
| 2012/0274612 A1 | 11/2012 | Sogabe et al. |
| 2013/0191804 A1 | 7/2013 | Bytheway et al. |
| 2013/0207911 A1 | 8/2013 | Barton et al. |
| 2013/0319137 A1 | 12/2013 | Grau et al. |
| 2014/0152579 A1 | 6/2014 | Frey |
| 2014/0152580 A1 | 6/2014 | Weaver et al. |
| 2016/0266710 A1* | 9/2016 | Bytheway ............. G06F 3/0446 |
| 2017/0115824 A1 | 4/2017 | Katsurahira |
| 2017/0131842 A1* | 5/2017 | Hashiguchi ......... G02F 1/13338 |
| 2017/0185197 A1 | 6/2017 | Shepelev |
| 2017/0255294 A1 | 9/2017 | Shepelev |
| 2018/0032171 A1 | 2/2018 | Bennett et al. |
| 2018/0188614 A1 | 7/2018 | Yeh |
| 2018/0188867 A1 | 7/2018 | Yeh |
| 2018/0261171 A1 | 9/2018 | Morein |
| 2020/0042154 A1 | 2/2020 | Ali et al. |
| 2020/0089343 A1 | 3/2020 | Kadowaki et al. |
| 2020/0104027 A1 | 4/2020 | Gourevitch et al. |
| 2020/0201509 A1 | 6/2020 | Kadowaki |
| 2020/0225801 A1 | 7/2020 | Monson et al. |
| 2021/0096693 A1 | 4/2021 | Ye |
| 2021/0181888 A1 | 6/2021 | Yan et al. |
| 2021/0405820 A1 | 12/2021 | Ye |
| 2021/0405822 A1 | 12/2021 | Feng |

FOREIGN PATENT DOCUMENTS

| | | |
|---|---|---|
| JP | 2014-63249 A | 4/2014 |
| JP | 2014-150181 A | 8/2014 |
| JP | 2016-218834 A | 12/2016 |
| JP | 2017-91018 A | 5/2017 |
| JP | 2017-91135 A | 5/2017 |

OTHER PUBLICATIONS

Japanese Office Action, dated Feb. 9, 2021, for Japanese Application No. 2020-080656, 7 pages. (with English machine translation).

* cited by examiner

SENSOR PANEL FOR DETECTING STYLUS SIGNAL SENT FROM STYLUS

BACKGROUND

Technical Field

The present disclosure relates to a sensor panel for detecting a stylus signal sent from a stylus, and more particularly to a sensor panel disposed in superposed relation to a display panel.

Description of the Related Art

Tablet-type electronic devices having a function to detect the position of a finger or stylus have a sensor panel disposed on a display panel. The sensor panel has a plurality of linear electrodes including a plurality of X electrodes extending in a Y direction and disposed at equal intervals in an X direction and a plurality of Y electrodes extending in the X direction and disposed at equal intervals in the Y direction. The display panel has a bezel area, where routing traces associated respectively with the linear electrodes are arranged as well as a plurality of flexible printed circuits (FPC) connection terminals. The linear electrodes and the FPC connection terminals are electrically connected to each other by the routing traces. The FPC connection terminals are crimped to terminals on a flexible printed circuit board and connected, through routing traces on the flexible printed circuit board, to a control integrated circuit (IC).

One type of known stylus is an active stylus. An active stylus includes a power supply and a signal processing circuit, and is configured to send an electric charge corresponding to a signal generated by the signal processing circuit to an electrode disposed in the vicinity of a stylus tip, i.e., a stylus electrode, to thereby send a stylus signal therefrom. The stylus signal includes a positional signal that is a burst signal indicating the position of the active stylus itself and a data signal representing various data, for example, stylus pressure data indicative of the value of a stylus pressure detected by the active stylus, data indicative of whether operating buttons (switches) mounted on a side surface and terminal end of the active stylus are turned on or off, and a unique identification (ID) written in the active stylus. For detecting the active stylus, a stylus signal is received by those linear electrodes in the sensor panel which are close to the stylus tip, and is supplied through FPC connection terminals to the IC. The IC determines an X coordinate of the active stylus based on the received levels of the stylus signals on the X electrodes and determines a Y coordinate of the active stylus based on the received levels of the stylus signals on the Y electrodes, thereby detecting the position of the active stylus in the touch surface.

Patent Document 1, listed below, discloses a position detecting device capable of detecting both a finger and an active stylus. In the position detecting device, signals received by a plurality of electrodes are supplied to a differential amplifier, and the position of the finger or the active stylus is determined based on the received level of an output signal from the differential amplifier, so that the adverse effect of extraneous noise is eliminated. A process of detecting a position using a differential amplifier as described above will hereinafter be referred to as a "differential process."

Patent Document 2, listed below, discloses a configuration example of a sensor panel.

PRIOR ART DOCUMENT

Patent Documents

Patent Document 1: Japanese Patent Laid-Open No. 2014-063249

Patent Document 2: U.S. Patent Publication No. 2013/0319137

BRIEF SUMMARY

Technical Problems

In recent years, efforts have been made to narrow the bezels of display panels, resulting in a narrower area where routing traces for sensor panels can be placed. As a result, various problems described below have arisen that need to be addressed.

For example, a narrowed bezel area has forced some of routing traces for sensor panels to be placed in positions superposed on electrically conductive parts, such as a metal frame of a display panel, an antenna cable of a wireless local area network (LAN), a camera module, etc., disposed in the bezel area. The superposed structure is prone to induce capacitances between the routing traces and the electrically conductive parts, causing part of electric currents flowing through the routing traces to flow into the electrically conductive parts. If the routing traces are superposed to different degrees on the electrically conductive parts, the distribution of stylus signals supplied to the IC may lose uniformity.

Also, the bezel area may be narrowed so much that the pitch of the routing traces for sensor panels needs to be made unprecedentedly smaller. The required smaller pitch may lead to decline in a production yield of sensor panels.

Further, as the narrowed bezel area becomes crowded with the routing traces, it becomes difficult to place (extend) electrodes in the bezel area. As a result, stylus signals received by the routing traces need to be used for detecting the position of an active stylus in the vicinity of the outer edge of the display area, which tends to lower the stylus detection accuracy in the vicinity of the outer edge of the display area.

One aspect of the present disclosure is directed to providing a sensor panel which solves or alleviates the problems that may be caused by a narrowed bezel of a display panel.

Technical Solution

According to a first aspect of the present disclosure, there is provided a sensor panel connected to an IC for detecting the position of an active stylus in a detection area, including a plurality of first electrodes extending in a first direction in the detection area and arrayed in the detection area in a second direction transverse to the first direction, a plurality of first routing traces associated respectively with the first electrodes and connected respectively to the first electrodes, and a plurality of first terminals associated respectively with the first routing traces and connecting the first routing traces to the IC, in which the first routing traces have respective first routing lines connected at an angle, which is not zero degrees, respectively to first trunk lines that are directly connected to the corresponding first electrodes, and the first trunk lines that are associated respectively with the first routing traces have substantially equal lengths.

According to a second aspect of the present disclosure, there is provided a sensor panel connected to an IC for detecting the position of an active stylus in a detection area, including a plurality of first electrodes extending in a first direction in the detection area and arrayed in the detection area in a second direction transverse to the first direction, a plurality of first routing traces associated respectively with the first electrodes and connected respectively to the first electrodes, and a plurality of first terminals associated respectively with the first routing traces and connecting the first routing traces to the IC, in which the first routing traces have, in a first routing trace area disposed adjacent to the detection area in the first direction, a large-pitch portion in which the first routing traces extend at a first pitch and a small-pitch portion in which the first routing traces extend at a second pitch smaller than the first pitch.

According to a third aspect of the present disclosure, there is provided a sensor panel connected to an IC for detecting the position of an active stylus in a detection area, including a plurality of first electrodes extending in a first direction in the detection area and arrayed in the detection area in a second direction transverse to the first direction, a plurality of first routing traces associated respectively with the first electrodes and connected respectively to the first electrodes, and a plurality of first terminals associated respectively with the first routing traces and connecting the first routing traces to the IC, in which the first routing traces include extension lines disposed in an area farther distanced from the first terminals than junctions thereof to the corresponding first electrodes as viewed in the second direction.

According to a combination of the first, second and third aspects of the present disclosure, there is provided a sensor panel connected to an IC for detecting the position of an active stylus in a detection area, including a plurality of first electrodes extending in a first direction in the detection area and arrayed in the detection area in a second direction transverse to the first direction, a plurality of first routing traces associated respectively with the first electrodes and connected respectively to the first electrodes, and a plurality of first terminals associated respectively with the first routing traces and connecting the first routing traces to the IC, in which the first routing traces have respective first routing lines connected at an angle, which is not zero degrees, respectively to first trunk lines that are directly connected to the corresponding first electrodes, the first trunk lines that are associated respectively with the first routing traces have substantially equal lengths, the first routing traces have, in a first routing trace area disposed adjacent to the detection area in the first direction, a large-pitch portion in which the first routing traces extend at a first pitch and a small-pitch portion in which the first routing traces extend at a second pitch smaller than the first pitch, and the first routing traces include extension lines disposed in an area farther distanced from the first terminals than junctions thereof to the corresponding first electrodes as viewed in the second direction.

Advantageous Effect

According to the first through third aspects of the present disclosure, it is possible to uniformize the degrees to which the first routing traces and an electrically conductive part disposed in a bezel area are superposed one on the other, in contrast to a structure, i.e., the structure illustrated in FIG. 1 of Patent Document 2, where the lengths of the respective trunk lines of the first routing traces are largely different from each other. Therefore, it is possible to solve or alleviate the problem that the distribution of stylus signals supplied to the IC loses uniformity due to the narrower bezel of the display panel.

According to the second aspect of the present disclosure, the first routing traces can be formed at the first pitch, which is larger than the second pitch, in an area where space is available for accommodating the larger pitch. Therefore, it is possible to solve or alleviate the problem that the production yield of sensor panels is likely to be lowered due to the narrower bezel of the display panel.

According to the third aspect of the present disclosure, even when the active stylus is in the vicinity of an outer edge of the display area and stylus signals received by not only the first electrodes but also the first routing traces need to be used for positional detection, it is possible to obtain an inter-electrode signal intensity distribution that is equivalent to the inter-electrode signal intensity distribution obtained when stylus signals are received only by the first electrodes. Accordingly, it is possible to solve or alleviate the problem that the accuracy with which to detect the position of the active stylus is lowered in the vicinity of the outer edges of the display area due to the narrowed bezel of the display panel.

DETAILED DESCRIPTION

Embodiments of the present disclosure will hereinafter be described in detail below with reference to the accompanying drawings.

Figure 1:
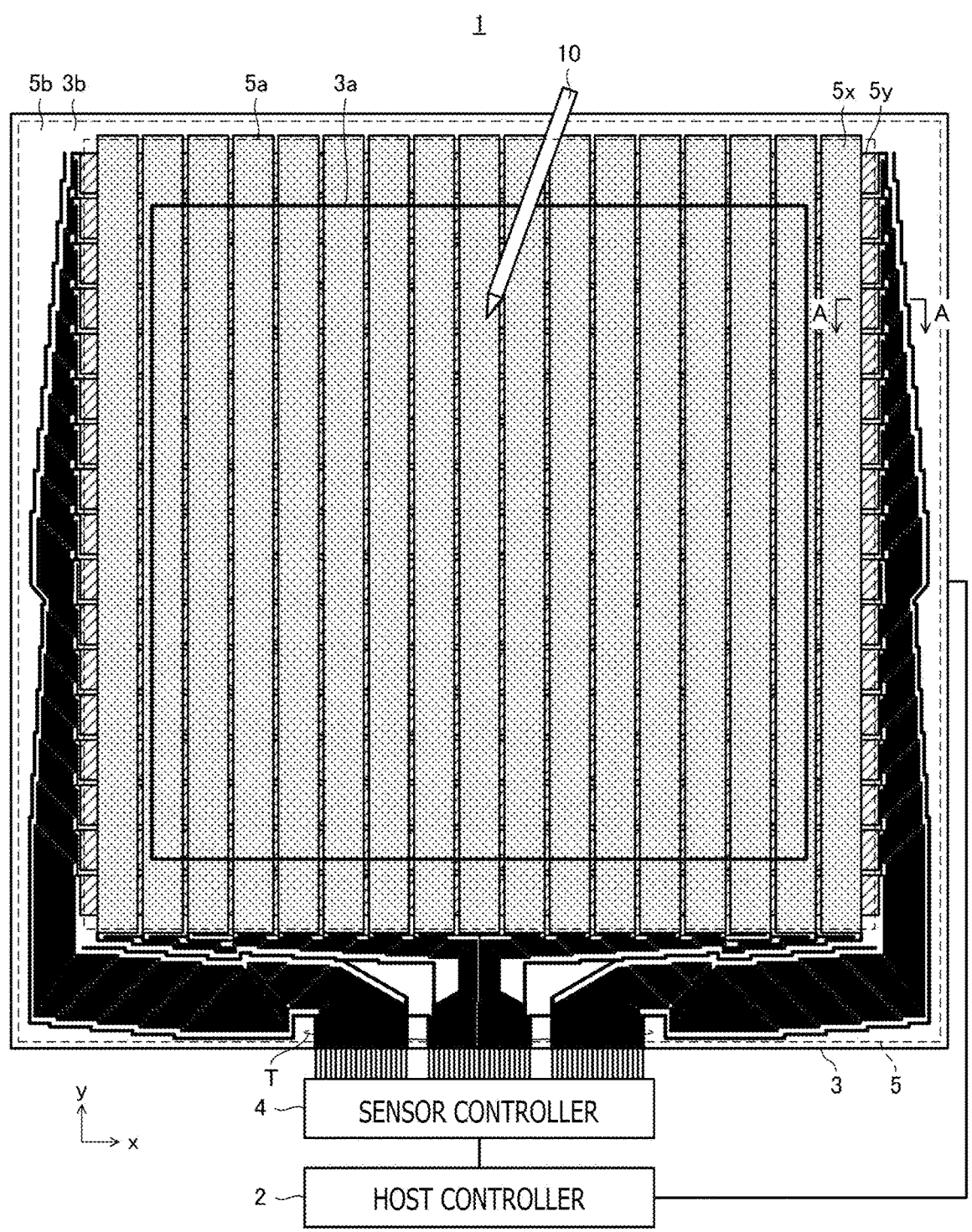
FIG. 1 is a schematic view illustrating the structure of an electronic device 1 and an active stylus 10 according to an embodiment of the present disclosure.
Figure 2:
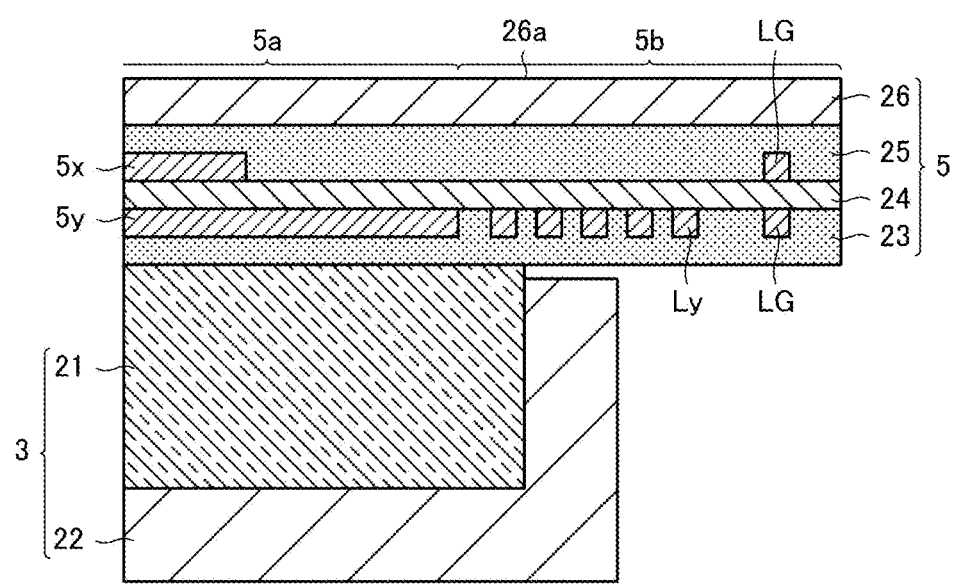
FIG. 2 is a cross-sectional view of the electronic device 1 taken along line A-A of FIG. 1.

FIG. 1 is a schematic view illustrating the structure of an electronic device 1 and an active stylus 10 according to an embodiment of the present disclosure. FIG. 2 is a cross-sectional view of the electronic device 1 taken along line A-A of FIG. 1.

The electronic device 1 according to the present embodiment is a tablet-type computer, for example. As illustrated in FIG. 1, the electronic device 1 has a host controller 2, a display panel 3, a sensor controller 4, and a sensor panel 5.

The host controller 2 is a computer having a processor and a memory, both not depicted, and performs various processing sequences when the processor reads programs stored in the memory and executes the read programs. The processing sequences include processes for controlling various parts of the electronic device 1 including the display panel 3 and the sensor controller 4 and processes for executing various applications including an image rendering application. The memory includes a main memory such as a dynamic random access memory (DRAM) or the like and an auxiliary storage device such as a flash memory or the like.

As illustrated in FIG. 2, the display panel 3 is a device having a liquid crystal module 21 including a plurality of pixels and a drive circuit therefor, both not depicted, and a metal frame 22 covering side and lower surfaces of the liquid crystal module 21. The drive circuit of the pixels is controlled by the host controller 2, to energize the pixels to display desired information on the display panel 3. Specific examples of the display panel 3 include a liquid crystal display, an organic electroluminescence (EL) display, an electronic paper display, and so forth.

As illustrated in FIG. 1, the display panel 3 has on its surface a display area 3a and a bezel area 3b. The display area 3a is a rectangular area where the pixels of the liquid crystal module 21 are arranged in a matrix form. The bezel area 3b is an area surrounding the outer sides of the display area 3a. The drive circuit of the liquid crystal module 21 and routing traces, not depicted, that connect the pixels to the drive circuit are disposed in the bezel area 3b.

The sensor controller 4 and the sensor panel 5 function as an input device for the host controller 2. As illustrated in FIG. 2, the sensor panel 2 includes an adhesive sheet 23 made of a transparent adhesive such as optical clear adhesive (OCA), optical clear resin (OCR), or the like, a film 24, an adhesive sheet 25 made of OCA, and a cover glass sheet 26, which are stacked successively from the display panel 3 side.

A plurality of linear electrodes 5x, a plurality of routing traces Lx, not depicted in FIG. 2, for connecting the linear electrodes 5x to FPC connection terminals T to be described later, and one or more guard traces LG to be connected to a particular potential such as a ground potential, are fixed to an upper surface of the film 24 by the adhesive sheet 25. A plurality of linear electrodes 5y, a plurality of routing traces Ly for connecting the linear electrodes 5y to FPC connection terminals T, and one or more guard traces LG are fixed to a lower surface of the film 24 by the adhesive sheet 23. As needed, the routing traces on the upper surface of the film 24 and the routing traces on the lower surface of the film 24 may be connected to each other by via electrodes that extend through the film 24.

The cover glass sheet 26 has an upper surface serving as a touch surface 26a that is a flat surface to be touched by the active stylus 10 or the user's finger. In at least the display area 3a, each of the components of the sensor panel 5 including the cover glass sheet 26 is made of a transparent material, or a nontransparent material whose layout density is configured to transmit light therethrough, such that the user can see the display area 3a of the display panel 3 through the sensor panel 5.

As illustrated in FIGS. 1 and 2, the sensor panel 5 has on its surface a detection area 5a and a routing trace area 5b. The detection area 5a is a rectangular area capable of positional detection, as described in detail later, using the linear electrodes 5x and 5y. As illustrated in FIG. 1, the detection area 5a is slightly larger than the display area 3a. The routing trace area 5b is an area surrounding the outer sides of the detection area 5a. The routing traces Lx, the routing traces Ly, the one or more guard traces LG, and the FPC connection terminals T for connecting those routing traces to the sensor controller 4 are disposed in the routing trace area 5b. As illustrated in FIG. 1, the FPC connection terminals T are arrayed in an x direction along a side of the panel 5, which is of a rectangular shape.

As illustrated in FIG. 1, the linear electrodes 5x extend in a y direction of the detection area 5a, also referred to as a second direction, and are arranged at equal intervals along the x direction, i.e., a direction transverse or perpendicular to the y direction in the detection area 5a. The x direction is also referred to as a first direction in the present disclosure. The linear electrodes 5y extend in the x direction and are arranged at equal intervals along the y direction. One of the groups of linear electrodes 5x and 5y may be shared as common electrodes of the liquid crystal module 21, not depicted. An electronic device 1 with such shared electrodes is referred to as "in-cell type" device. In FIG. 1 and subsequent figures, only 17 linear electrodes 5x and 17 linear electrodes 5y are illustrated for ease of illustration, though typically more linear electrodes 5x and 5y may be actually disposed in the detection area 5a.

The sensor controller 4 is an IC having a processor and a memory, both not depicted, and is mounted on a flexible printed circuit (FPC) board, not depicted. The flexible printed circuit board is crimped to the FPC connection terminals T disposed in the routing trace area 5b of the sensor panel 5, and the sensor controller 4 is electrically connected to the routing traces in the sensor panel 5 through the crimped joints.

Functionally, when the processor reads programs stored in the memory and executes the read programs, the sensor controller 4 operates to detect positions on the touch surface 26a that are indicated by the active stylus 10 and the user's finger, not depicted, and to receive a data signal sent from the active stylus 10. The position indicated by the active stylus 10 is detected based on the capacitance principle or the active capacitive coupling principle. The position indicated by the user's finger is detected based on the capacitance principle.

According to the capacitance principle, the position indicated by the active stylus 10 or the position indicated by the user's finger is acquired based on a change in the capacitance between the linear electrodes 5x and 5y and a stylus electrode or the user's finger, wherein the stylus electrode is disposed in the vicinity of a stylus tip of the active stylus 10. For detecting a position according to the capacitance principle, the sensor controller 4 supplies a predetermined detection signal successively to the linear electrodes 5x and measures a potential at each of the linear electrodes 5y each time the detection signal is supplied to the linear electrodes 5x. If the stylus electrode or the user's finger is moving toward a point of intersection between a linear electrode 5x and a linear electrode 5y, part of an electric current flowing from the linear electrode 5x to the linear electrode 5y flows into the body of the user, so that the potential measured at the linear electrode 5y is reduced. The sensor controller 4 detects the position indicated by the stylus electrode or the user's finger based on this change in the potential.

According to the active capacitive coupling principle, a stylus signal sent from the active stylus 10 is received by the sensor panel 5, and the position indicated by the active stylus 10 is detected based on the received stylus signal. As described above, the stylus signal includes a positional signal, which is an unmodulated burst signal, and a data signal representing various data related to the active stylus 10. The various data include stylus pressure data representing a pressure applied to the stylus tip of the active stylus 10.

For detecting a position according to the active capacitive coupling principle, the sensor controller 4 receives positional signals respectively at the linear electrodes 5x and 5y, and detects the position indicated by the active stylus 10 based on the received positional signals. More specifically, the sensor controller 4 interpolates the received intensities of the positional signals received respectively at the linear electrodes 5x according to a predetermined interpolating process to derive an x coordinate of the indicated position and also interpolates the received intensities of the positional signals received respectively at the linear electrodes 5y according to a predetermined interpolating process to derive a y coordinate of the indicated position. The sensor controller 4 also detects a data signal sent from the active stylus 10 using those linear electrodes 5x and 5y which are closest to the indicated position that is detected.

The detection of indicated positions by the sensor controller 4 will be described in greater detail below. The sensor controller 4 according to the present embodiment detects the positions indicated by the active stylus 10 and the user's finger according to the above-mentioned process using a differential amplifier, i.e., the differential process, in order to reduce the adverse effects of noise which is substantially uniformly caused or introduced in the linear electrodes 5x and 5y, e.g., noise caused by the display panel 3.

Specifically, for detecting positions according to the capacitance principle, the sensor controller 4 addresses each of the linear electrodes 5x in turn and supplies a predetermined detection signal, described above, to one or more adjacent linear electrodes 5x including the addressed linear electrode 5x. Then, the sensor controller 4 addresses each of the linear electrodes 5y in turn and connects the addressed linear electrode 5y and another linear electrode 5y that is spaced from the addressed linear electrode 5y by a predetermined number (including zero) of linear electrode 5y respectively to the noninverting and inverting input terminals of a differential amplifier. The sensor controller 4 then detects the position indicated by the active stylus 10 or the user's finger based on the potential of an output signal from the differential amplifier.

For detecting positions according to the active capacitive coupling principle, e.g., for detecting an x coordinate, the sensor controller 4 addresses each of the linear electrodes 5x in turn and connects the addressed linear electrode 5x and another linear electrode 5x that is spaced from the addressed linear electrode 5x by a predetermined number (including zero) of linear electrode 5x respectively to the noninverting and inverting input terminals of a differential amplifier. The sensor controller 4 then detects an x coordinate of the position indicated by the active stylus 10 based on the potential of an output signal from the differential amplifier. For detecting a y coordinate, the sensor controller 4 addresses each of the linear electrodes 5y in turn and connects the addressed linear electrode 5y and another linear electrode 5y that is spaced from the addressed linear electrode 5y by a predetermined number (including zero) of linear electrode 5y respectively to the noninverting and inverting input terminals of a differential amplifier. The sensor controller 4 then detects a y coordinate of the position indicated by the active stylus 10 based on the potential of an output signal from the differential amplifier.

With the detection of positions according to the differential process, since the differential amplifier serves to cancel noise uniformly caused in the linear electrodes 5x and 5y based on either the capacitance principle or the active capacitive coupling principle, the sensor controller 4 can detect the indicated position accurately without being adversely affected by noise.

The sensor controller 4 reports to the host controller 2 coordinates representing the positions, thus detected, indicated by the active stylus 10 and the user's finger and the various data included in the data signal received from the active stylus 10. The sensor controller 4 also acquires stylus-down information indicating that the active stylus 10 has contacted the touch surface and stylus-up information indicating that the active stylus 10 has been separated (lifted) from the touch surface, based on the stylus pressure data received from the active stylus 10, and reports to the host controller 2 the acquired stylus-down information and stylus-up information at respective timings.

In response to the coordinates input from the sensor controller 4, the host controller 2 performs at least one of the processes of displaying a pointer and generating ink data. The host controller 2 performs the process of displaying a pointer by displaying a predetermined pointer image on the display area 3a of the display panel 3 at a position corresponding to the input coordinates.

Ink data refer to data including control points provided respectively by a plurality of coordinates successively supplied from the sensor controller 4 and curve data produced by interpolating the intervals between the control points according to a predetermined interpolating curve. With respect to the user's finger, the host controller 2 starts generating ink data when the coordinates start to be input thereto and finishes generating ink data when input of the coordinates ceases. With respect to the active stylus 10, the host controller 2 starts generating ink data when the stylus-down information is input and finishes generating ink data when the stylus-up information is input. In generating ink data with respect to the active stylus 10, the host controller 2 also controls the width and/or the degree of transparency of the curve data of the ink data based on the stylus pressure data received from the active stylus 10. The host controller 2 renders the generated ink data, displays the rendered ink data on the display panel 3, and stores the generated ink data in its own memory.

Figure 3:
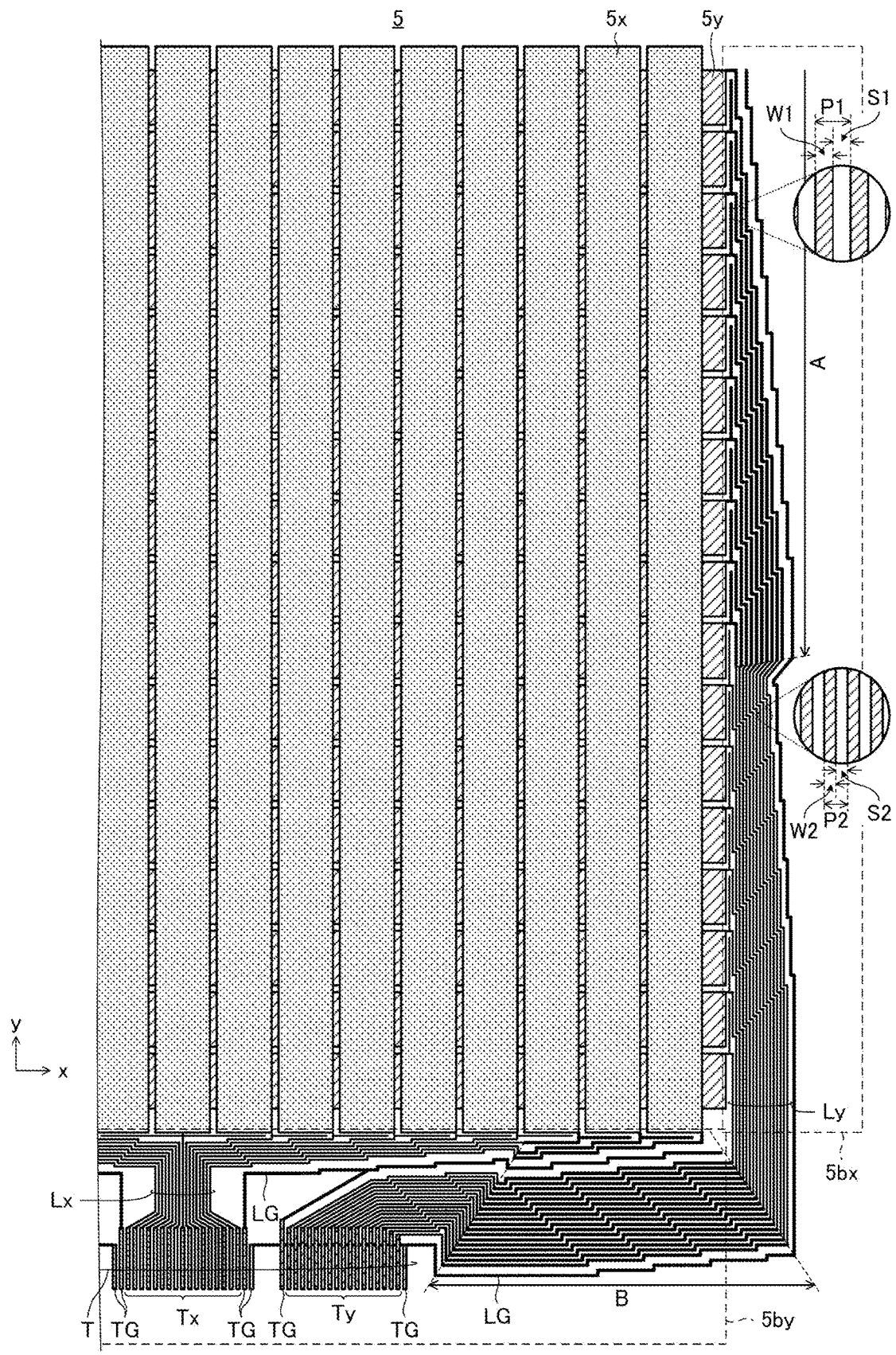
FIG. 3 is an enlarged view of a portion of a sensor panel 5 illustrated in FIG. 1.
Figure 5:
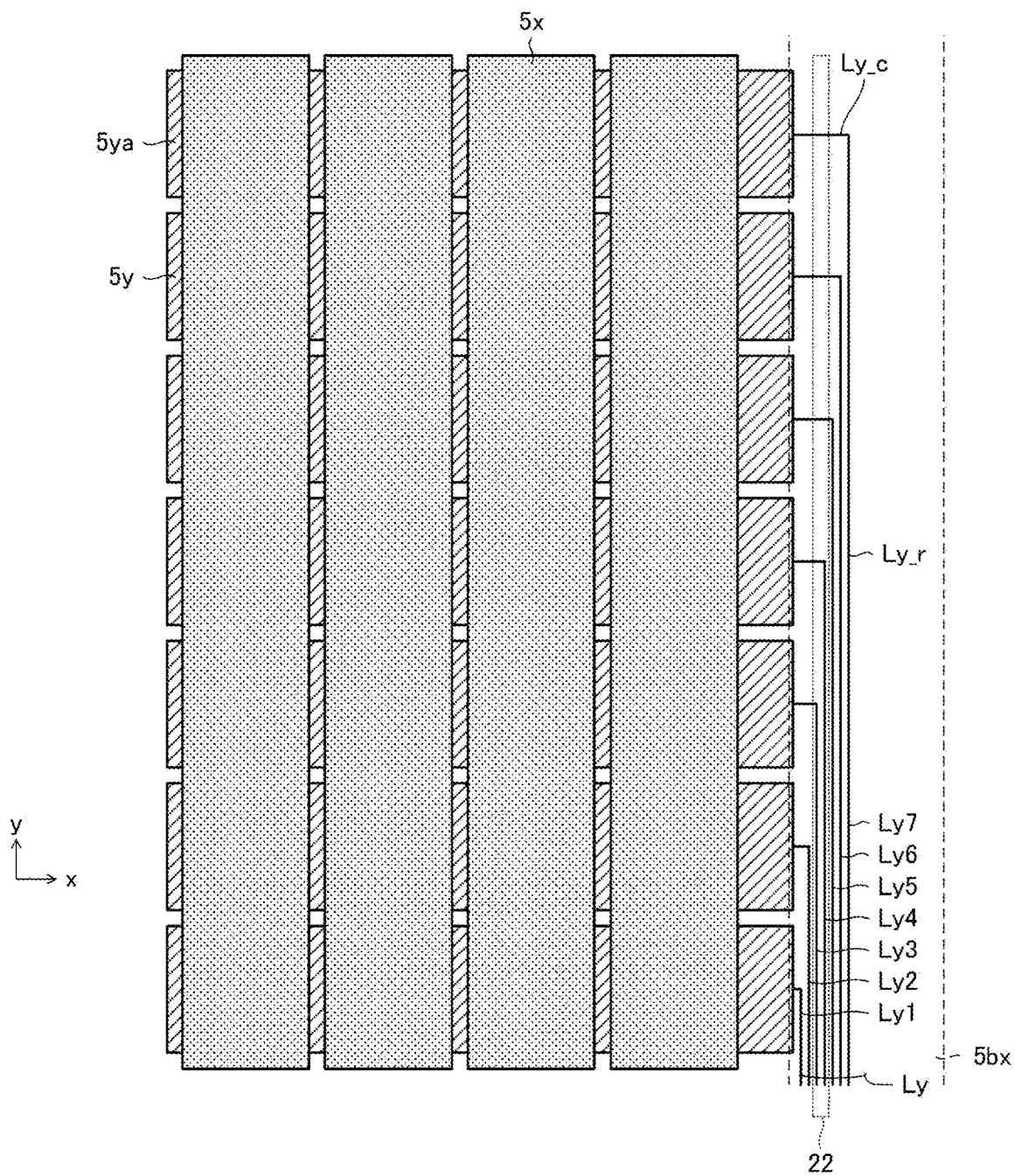
FIG. 5 is an enlarged view of a portion of a sensor panel 5 according to the background art of the present disclosure.

FIG. 3 is an enlarged view of a portion of the sensor panel 5 illustrated in FIG. 1. A portion of the sensor panel 5 which is not illustrated in FIG. 5 is in axially symmetrical relation to the illustrated position with respect to a symmetry axis at the center along the x direction.

As illustrated in FIG. 3, the routing traces Lx (second routing traces) are associated respectively with the linear electrodes 5x and connected to y-direction ends of the corresponding linear electrodes 5x. The routing traces Ly (first routing traces) are associated respectively with the linear electrodes 5y and connected to x-direction ends of the corresponding linear electrodes 5y. In the example illustrated in FIG. 3, two routing traces Ly are associated with each linear electrode 5y and respectively connected to both ends of the corresponding linear electrode 5y in the x direction. However, as with the routing traces Lx, only one routing trace Ly may be associated with each linear electrode 5y.

The routing traces Lx and Ly extend parallel to each other basically at equal pitches except in the vicinity of their junctions to the corresponding linear electrodes. The routing traces Lx and Ly extend parallel to each other for the purpose of uniformizing capacitances formed between adjacent routing traces. In the example illustrated in FIG. 3, each of the groups of routing traces Lx and Ly includes portions indicated by A and B where the routing traces extend at a first pitch P1 (=routing trace width W1+inter-trace space width S1) and portions other than the portions indicated by A and B where the routing traces extend at a second pitch P2 (=routing trace width W2+inter-trace space width S2) smaller than the first pitch P1. This routing trace structure is a feature according to a second aspect of the present disclosure, and will be described in detail later.

The FPC connection terminals T include a plurality of FPC connection terminals Tx (second terminals), a plurality of FPC connection terminals Ty (first terminals), and a plurality of FPC connection terminals TG. The FPC connection terminals Tx are associated respectively with the routing traces Lx and connected to the corresponding routing traces Lx. The FPC connection terminals Ty are associated respectively with the routing traces Ly and connected to the corresponding routing traces Ly. The FPC connection terminals TG are connected to either one of the guard traces LG.

The FPC connection terminals Tx are disposed at equal spaced intervals centrally along the x direction in an area 5by illustrated in FIG. 3 (an area of the routing trace area 5b that is adjacent to the detection area 5a in the y direction, i.e., a "second routing trace area"). The FPC connection terminals Ty, which are as many as the number of linear electrodes 5y, are disposed at equal spaced intervals on both sides of the FPC connection terminals Tx in the x direction. One or more of the FPC connection terminals TG are disposed on both sides of the group of FPC connection terminals Tx in the x direction and both sides of the group of FPC connection terminals Ty in the x direction. Since the FPC connection terminals T are disposed in this manner, the routing traces Lx extend only in the area 5by, and the routing traces Ly extend from an area 5bx illustrated in FIG. 3 (an area of the routing trace area 5b that is adjacent to the detection area 5a in the x direction, i.e., a "first routing trace area") into the area 5by.

Embodiments according to first through third aspects of the present disclosure will successively be described below.

The first aspect of the present disclosure is directed to solving the problem that the distribution of stylus signals supplied to the sensor controller 4 might possibly lose uniformity as the bezel of the display panel 3 is narrowed.

The embodiment according to the first aspect of the present disclosure will hereinafter be described below with reference to FIGS. 3 through 5.

The problem of the background art that corresponds to the first aspect of the present disclosure will first be described in detail below.

FIG. 5 is an enlarged view of a portion of a sensor panel 5 according to the background art of the present disclosure. As illustrated in FIG. 5, the sensor panel 5 according to the background art includes a plurality of (first) routing traces Ly having respective (first) routing lines Ly_r connected respectively to (first) trunk lines Ly_c that are connected directly to the corresponding linear electrodes 5y at an angle (specifically 90 degrees) that is not zero degrees. The trunk lines Ly_c are also part of the routing traces Ly. The routing lines Ly_r are straight lines parallel to the y direction, allowing the routing traces Ly to extend parallel to each other at equal pitches.

According to the background art, the trunk lines Ly_c are of different lengths in the respective routing traces Ly. More specifically, the trunk lines Ly_c are progressively longer in a direction from the routing trace Ly (routing trace Ly1 illustrated in FIG. 5) connected to the linear electrode 5y that is close to the area 5by toward the routing trace Ly routing trace Ly7 illustrated in FIG. 5) connected to the linear electrode 5y that is remote from the area 5by. This is because each of the routing lines Ly_r is a straight line parallel to the y direction.

If efforts are made to narrow the bezel of the display panel 3, reducing the bezel area 3b, then some of the routing traces for the sensor panel 5 have to be placed in positions superposed on electrically conductive parts disposed in the bezel area 3b. The electrically conductive parts described above include various parts, such as a metal frame of the display panel 3, an antenna cable of a wireless LAN and a camera module, etc. FIG. 5 illustrates, by way of example, the position of the metal frame 22, also depicted in FIG. 2, in broken lines.

The superposed structure is liable to induce capacitances between the routing traces for the sensor panel 5 and the electrically conductive parts, causing part of electric currents flowing through the routing traces to flow into the electrically conductive parts. If the routing traces are superposed to different degrees on the electrically conductive parts, the distribution of stylus signals supplied to the sensor controller 4 may lose uniformity.

In the example illustrated in FIG. 5, of seven routing traces Ly1 through Ly7, the routing lines Ly_r of the routing traces Ly3 and Ly4 are superposed in their entirety on the metal frame 22, whereas the routing lines Ly_r of routing traces Ly of the routing traces Ly1, Ly2, Ly5 through Ly7 are not superposed in their entirety on the metal frame 22. Electric currents flowing through the routing traces Ly3 and Ly4 are absorbed to a large extent by the metal frame 22, and electric currents flowing through the routing traces Ly1, Ly2, Ly5 through Ly7 are hardly absorbed by the metal frame 22. As a result, stylus signals that are supplied through the routing traces Ly3 and Ly4 to the sensor controller 4, and stylus signals that are supplied through the routing traces Ly1, Ly2, Ly5 through Ly7 to the sensor controller 4 lose uniformity.

According to the first aspect of the present disclosure, such lost uniformity can be prevented. A structure of the sensor panel 5 according to the first aspect of the present disclosure will hereinafter be described in detail below.

Figure 4:
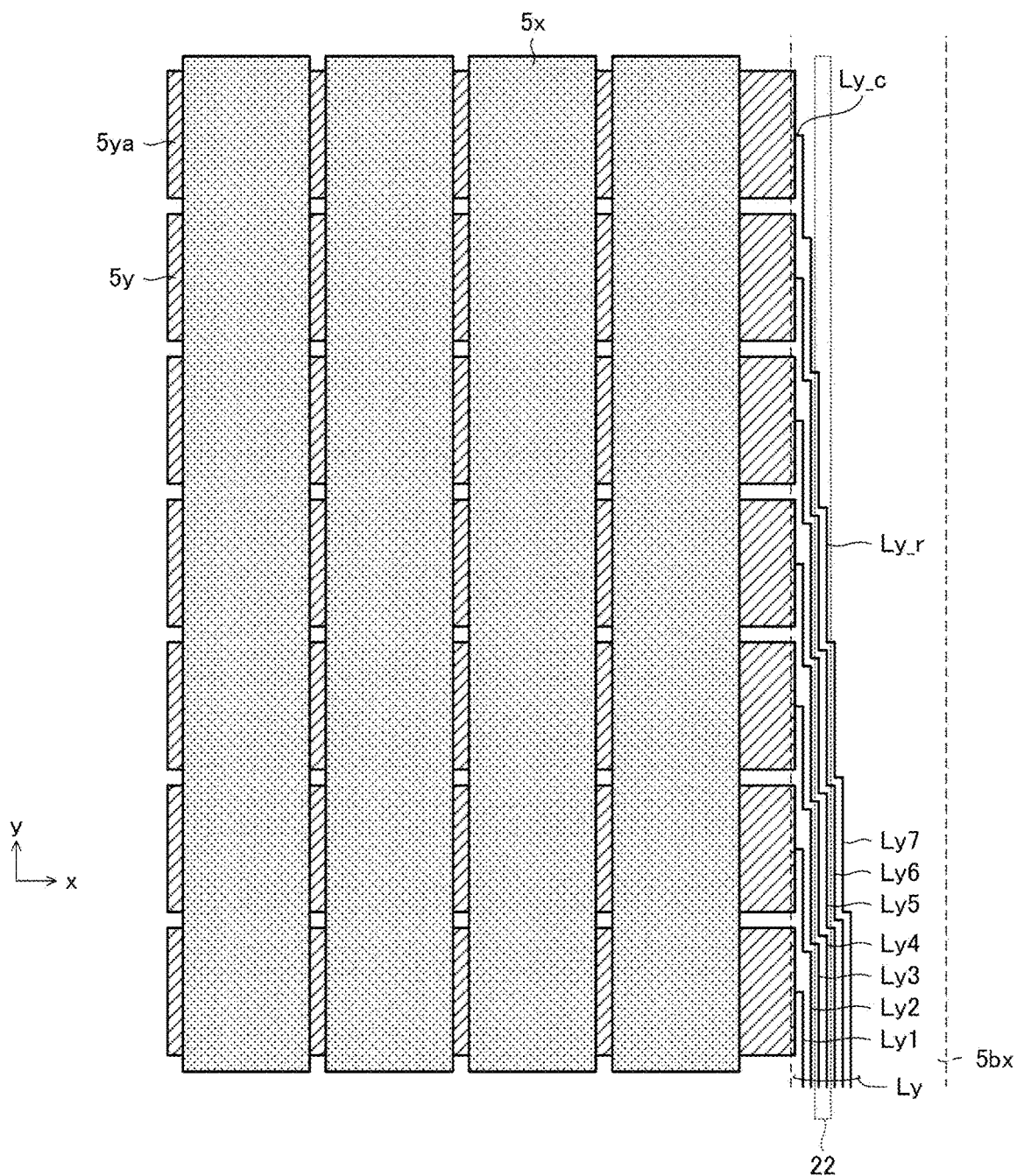
FIG. 4 is an enlarged view of a portion of a sensor panel 5 illustrated in FIG. 1, schematically illustrating the components of the sensor panel 5 depicted in FIG. 3, exclusive of the components according to second and third aspects of the present disclosure.

FIG. 4 is an enlarged view of a portion (part of the area 5bx and its neighborhood) of the sensor panel 5 illustrated in FIG. 1. FIG. 4 schematically illustrates the components of the sensor panel 5 illustrated in FIG. 1, exclusive of the components according to the second and third aspects of the present disclosure.

As illustrated in FIG. 4, in the sensor panel 5 according to the present embodiment, the respective trunk lines Ly_c of a plurality of routing traces Ly are of lengths that are set to substantially equal values. The phase "substantially equal values" means that the lengths are equal to each other within a range of errors, such as patterning shifts or the like, that can be caused when the routing traces Ly are formed. Furthermore, in order that the routing traces Ly can be disposed without crossing each other while at the same time the lengths of the respective trunk lines Ly_c of the routing traces Ly are set to substantially equal values, the routing lines Ly_r of the respective routing traces Ly include a plurality of straight portions extending in the y direction and disposed in different positions in the x direction. More specifically, as illustrated in FIG. 4, the routing lines Ly_r extend stepwise.

By employing the structure described above, it is possible according to the present embodiment to uniformize the degrees to which the routing traces Ly and the electrically conductive part disposed in the bezel area 3b are superposed one on the other, in contrast to the background art illustrated in FIG. 5 and the structure illustrated in FIG. 1 of Patent Document 2 where the lengths of the respective trunk lines Ly_c of the routing traces Ly are largely different from each other. Therefore, it is possible to solve or alleviate the problem that the distribution of stylus signals supplied to the sensor controller 4 loses uniformity due to the narrower bezel of the display panel 3.

The advantage will specifically be described below with reference to the example illustrated in FIG. 4. According to the example illustrated in FIG. 4, each of the routing traces Ly3 through Ly7 of the illustrated seven routing traces Ly1 through Ly7 is partly superposed on the metal frame 22. Therefore, compared with the example illustrated in FIG. 5, the distribution of stylus signals supplied through the routing traces Ly to the sensor controller 4 is kept uniform.

Though only the routing traces Ly are illustrated in FIGS. 4 and 5, the structure and advantage also apply to the routing traces Lx. Specifically, as illustrated in FIG. 3, a plurality of (second) routing traces Lx are respectively formed of routing lines Ly_r (second routing lines) connected respectively, at an angle that is not zero degrees (e.g., 90 degrees), to trunk lines (second trunk lines) that are connected directly to the corresponding linear electrodes 5y. The routing lines include a plurality of straight portions extending in the x direction and disposed in different positions in the y direction. More specifically, the routing lines extend stepwise. Therefore, with respect to the routing traces Lx, it is also possible to solve or alleviate the problem that the distribution of stylus signals supplied to the sensor controller 4 loses uniformity due to the narrower bezel of the display panel 3.

According to the first aspect of the present disclosure, as described above, it is possible to uniformize the degrees to which the routing traces Ly and the electrically conductive part disposed in the bezel area 3b are superposed one on the other, in contrast to the structure where the lengths of the respective trunk lines Ly_c of the routing traces Ly are largely different from each other. The advantage also applies to the routing traces Lx. Therefore, it is possible to solve or alleviate the problem that the distribution of stylus signals supplied to the sensor controller 4 loses uniformity due to the narrower bezel of the display panel 3.

As illustrated in FIG. 3, the routing traces Ly should preferably be stepwise in the area 5by as well as in the area 5bx. With such structure, even if the routing traces Ly are superposed on an electrically conductive part in the area 5by, it is possible to reduce the possibility that the distribution of stylus signals supplied to the sensor controller 4 may lose uniformity. Since the routing traces Lx, the routing traces Ly, and the guard traces LG can be formed parallel to each other in the area 5by, capacitances formed between these routing traces can be uniformized.

The shape of the routing lines required to attain the above advantage is not limited to the stepwise shape illustrated in FIGS. 3 and 4.

Figure 6:
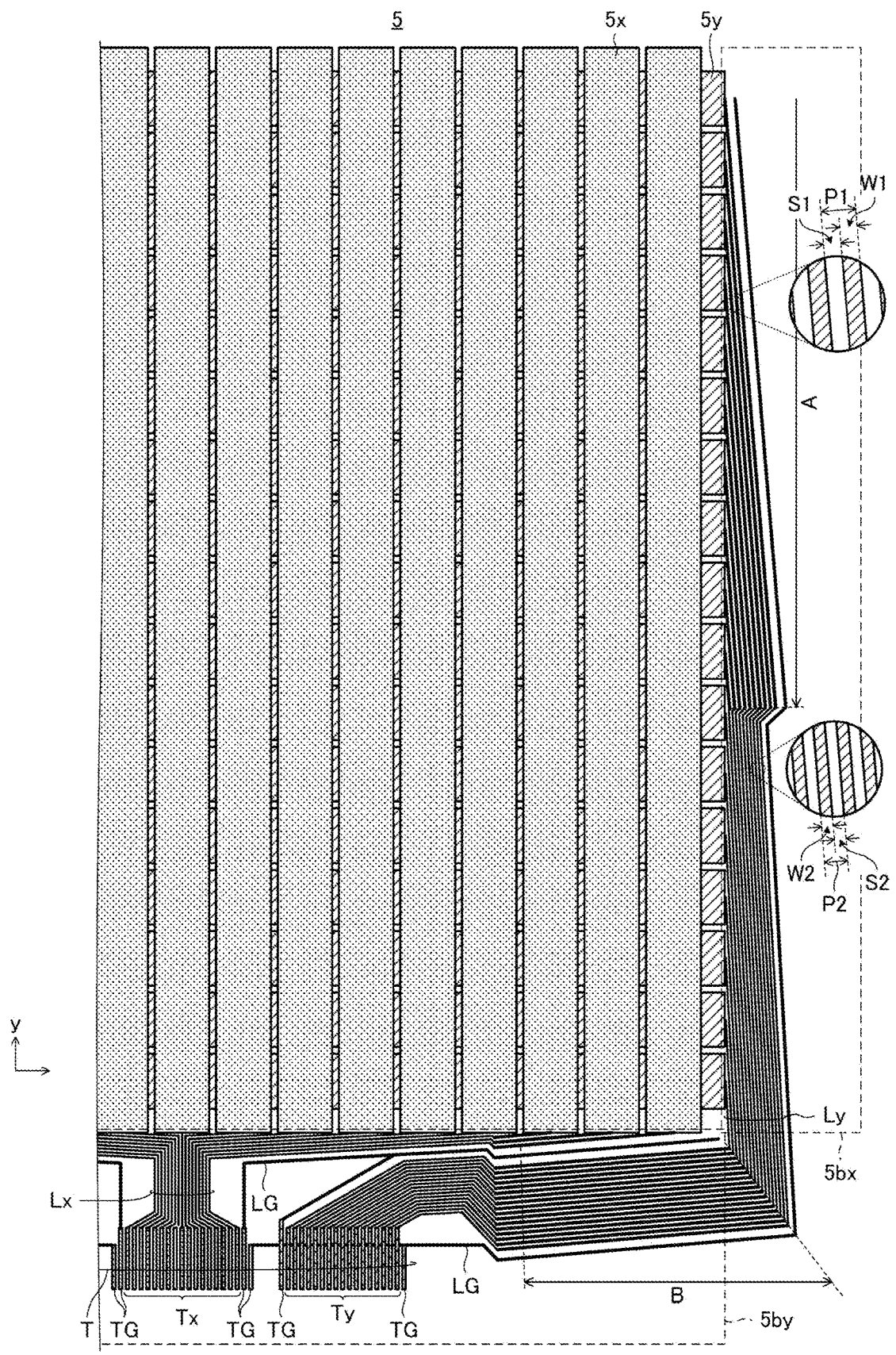
FIG. 6 is an enlarged view of a portion of a sensor panel 5 according to a first modification of the present embodiment.

FIG. 6 is an enlarged view of a portion of a sensor panel 5 according to a first modification of the present embodiment. In the example illustrated in FIG. 6, the routing lines of the respective routing traces Ly include portions formed in the area 5bx which have straight portions inclined relative to the y direction and also include portions formed in the area 5by which have straight portions inclined relative to the x direction. The routing lines of the respective routing traces Lx also have straight portions inclined relative to the x direction. Trunk lines corresponding to the respective routing traces Lx and Ly have a length set to zero. Specific angles at which the routing trace portions are inclined are constant except for portions where pitches are changed according to the second aspect described later and an area between the area 5bx and the area 5by.

With the modified structure, as is the case with the example illustrated in FIG. 3, it is possible to solve or alleviate the problem that the distribution of stylus signals supplied to the sensor controller 4 loses uniformity due to the narrower bezel of the display panel 3. The angle at which the routing lines of the respective routing traces Ly are inclined relative to the x direction in the area 5by may be the same as the angle at which the routing lines of the respective routing traces Lx are inclined relative to the x direction, so that the routing traces Lx, the routing traces Ly, and the guard traces LG can be formed parallel to each other in the area 5bx, allowing capacitances formed between these routing traces to be uniformized.

FIG. 6 illustrates the structure in which the length of the trunk lines Ly_c is zero. However, the length of the trunk lines Ly_c may be set to a value larger than zero. This alternative will be described below with reference to FIG. 7.

Figure 7:
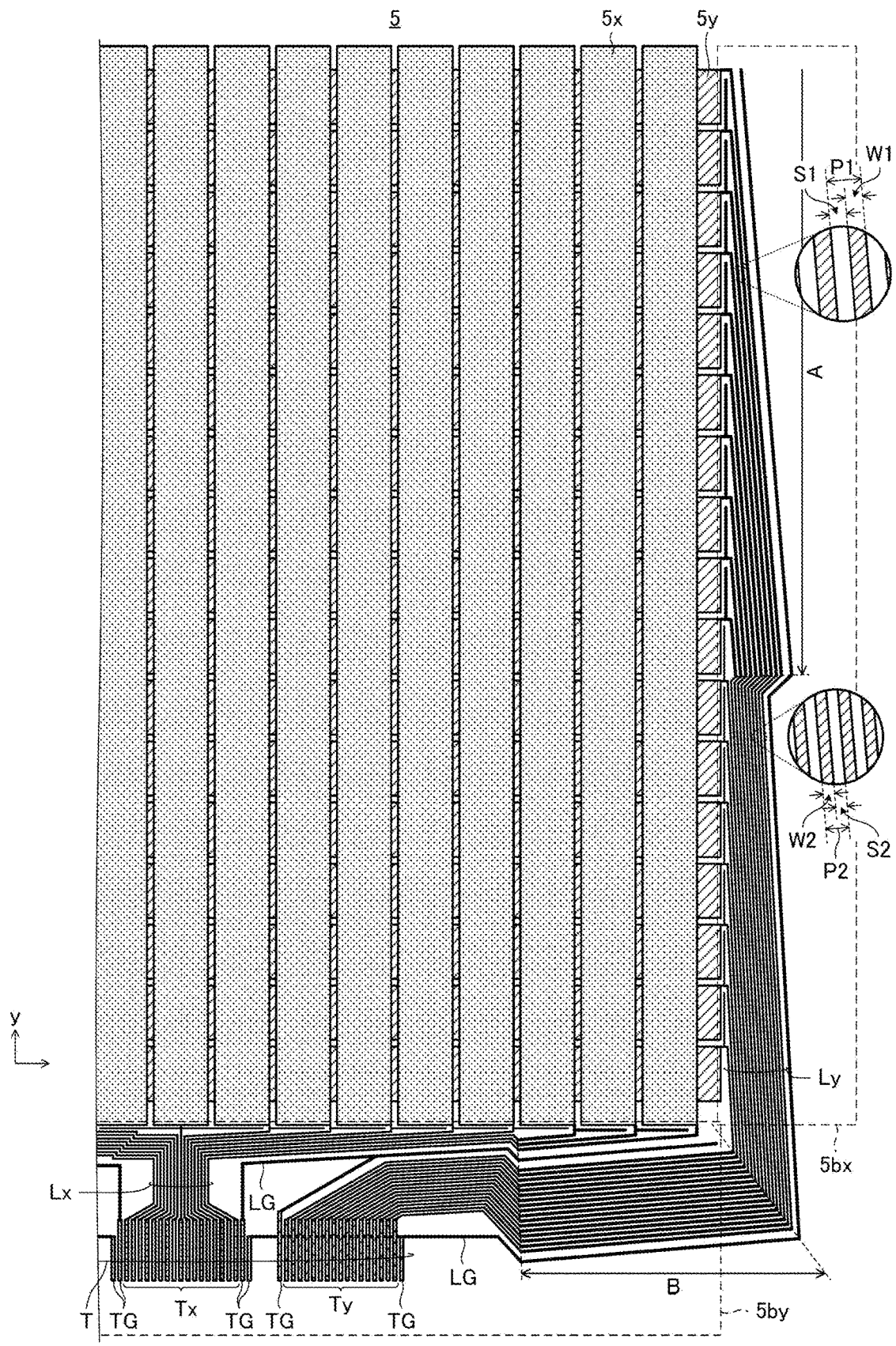
FIG. 7 is an enlarged view of a portion of a sensor panel 5 according to a second modification of the present embodiment.

FIG. 7 is an enlarged view of a portion of a sensor panel 5 according to a second modification of the present embodiment. The example illustrated in FIG. 7 is different from the first modification illustrated in FIG. 6 in that the length of the trunk lines Ly_c is larger than zero and, in addition, a structure according to the third aspect of the present disclosure, to be described later, is incorporated. The trunk lines of the respective routing traces Lx and Ly are connected to the routing lines at an angle larger than 90 degrees because the routing lines are inclined. By setting the length of the trunk lines Ly_c to a value larger than zero, it is possible to use the first and third aspects of the present disclosure in combination with each other.

Figure 8:
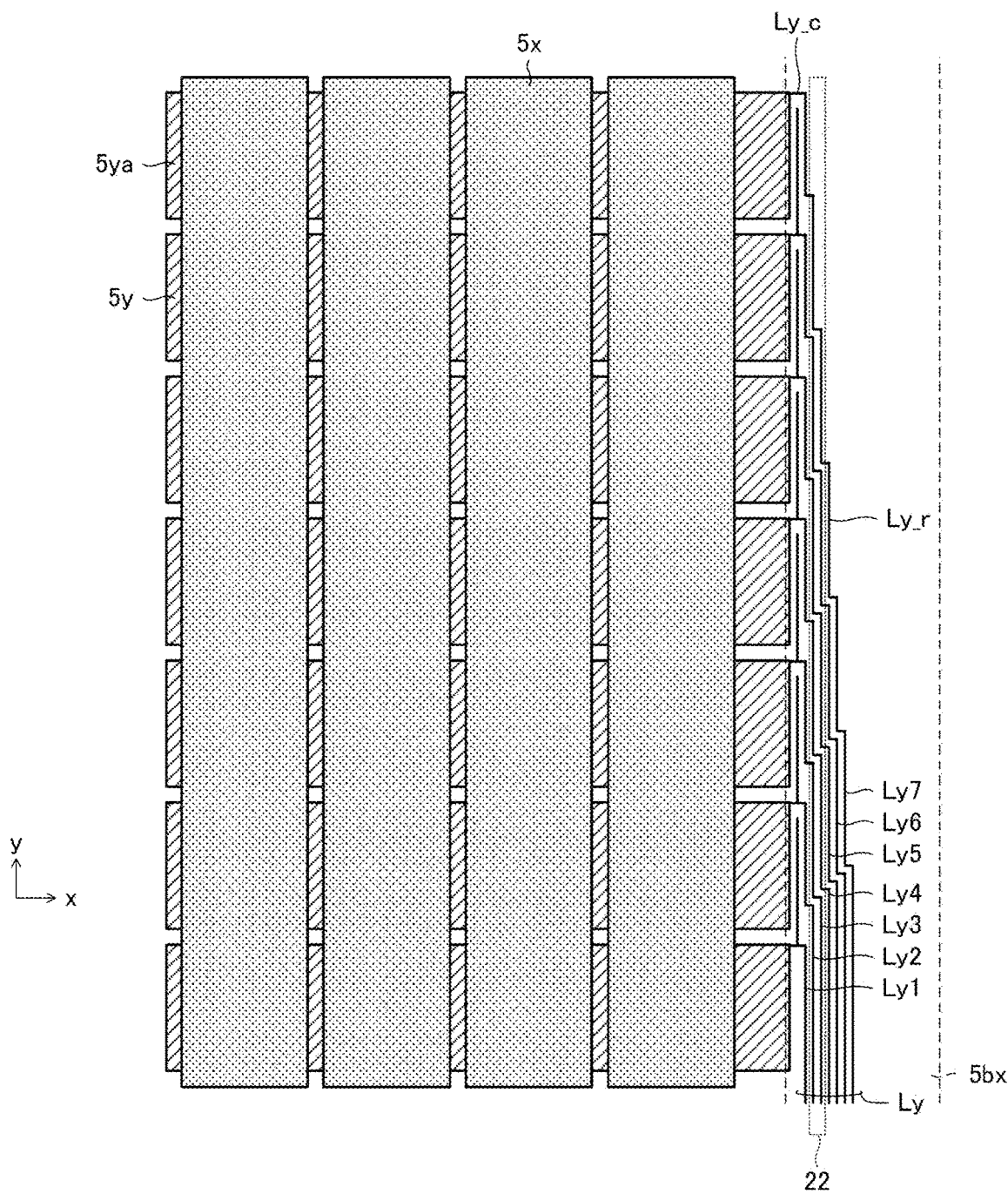
FIG. 8 is a view illustrating an example of sensor panel 5 according to the structure depicted in FIG. 4 to which the structure according to the third aspect of the present disclosure is added.

FIG. 8 is a view illustrating an example of sensor panel 5 according to the structure depicted in FIG. 4 to which the structure according to the third aspect of the present disclosure is added. In this example, the length of the trunk lines Ly_c is set to a value larger than zero, making it possible to combine the third aspect therewith. The structure of the sensor panel 5 illustrated in FIG. 8 is identical to a structure illustrated in FIG. 11 to be described later.

The second aspect of the present disclosure will be described in detail below. The second aspect is aimed at solving the problem that as the bezel of the display panel 3 is narrowed, the pitch of routing traces is so reduced as to cause a reduced production yield of sensor panels 5. The second aspect of the present disclosure will hereinafter be described with reference to FIG. 3.

As illustrated in FIG. 3, the routing traces Ly according to the present embodiment have, in the area 5bx, a portion where they extend parallel to each other at a first pitch P1 (a portion indicated by A, wherein the portion where the routing traces Ly extend parallel to each other at the first pitch P1 will hereinafter be referred to as "large-pitch portion") and a portion where they extend parallel to each other at a second pitch P2 that is smaller than the first pitch P1 (a portion other than the portion indicated by A, wherein the portion where the routing traces Ly extend parallel to each other at the second pitch P2 will hereinafter be referred to as "small-pitch portion"). Stated otherwise, the routing traces Ly has the large-pitch portion and the small-pitch portion in their portion that extends in the y direction. The small-pitch portion is formed closer to the FPC terminals Ty than the large-pitch portion. In the large-pitch portion, both the routing trace widths and the inter-trace space widths are set to values larger than those in the small-pitch portion.

The routing traces Lx according to the present embodiment have, in the area 5by, a large-pitch portion (a portion indicated by B) and a small-pitch portion (a portion other than the portion indicated by B). The small-pitch portion is formed closer to the FPC terminals Tx than the large-pitch portion.

With the routing traces Lx and Ly being formed as described above, the sensor panel 5 according to the present embodiment makes it possible to have routing traces extend at a relatively small pitch in an area where the number of routing traces extending parallel to each other is relatively large, i.e., an area where space is limited, and to have routing traces extend at a relatively large pitch in an area where the number of routing traces extending parallel to each other is relatively small, i.e., an area where more space is available. Therefore, inasmuch as the formation of routing traces at a small pitch (which is responsible for reducing a production yield), can be minimized, it is possible to solve or alleviate the problem that efforts to narrow the bezel of display panels are likely to cause a reduced production yield of sensor panels 5.

In the area 5by, as illustrated in FIG. 3, the routing traces Ly should preferably have a large-pitch portion (a portion indicated by B) and a small-pitch portion (a portion other than the portion indicated by B). With the routing traces Ly being thus arranged in the area 5by, not only the routing traces Lx but also the routing traces Ly can be formed at a relatively large pitch in an area in the area 5by where the number of parallel routing traces Lx is small. Accordingly, it is possible to further increase the production yield of sensor panels 5.

According to the second aspect of the present disclosure, as described above, the routing traces Lx and Ly can be formed at the first pitch P1 that is larger than the second pitch P2 in an area where space is available. Therefore, it is possible to solve or alleviate the problem that the production yield of sensor panels 5 is likely to be lowered due to the narrower bezel of the display panel 3.

The value (size) of a routing trace pitch affects an inter-trace capacitance per unit length. In case the routing traces Lx and Ly have the large-pitch portions and the small-pitch portions as described above, different inter-trace capacitances per unit length may possibly occur in the large-pitch portions and the small-pitch portions, respectively. Since the differences between the inter-trace capacitances are not preferable for the purpose of keeping constant the quality of stylus signals supplied to the sensor controller 4, the sensor panel 5 according to the present embodiment has ratios established between routing trace widths and inter-trace space widths respectively in the large-pitch portions and the small-pitch portions, so that the inter-trace capacitances per unit length are of essentially the same value in the large-pitch portions and the small-pitch portions. The phrase "essentially the same value" covers inter-trace capacitances whose values are close enough not to cause practical problems. The ratios will hereinafter be described in detail below with reference to FIGS. 9 and 10.

Figure 9A:
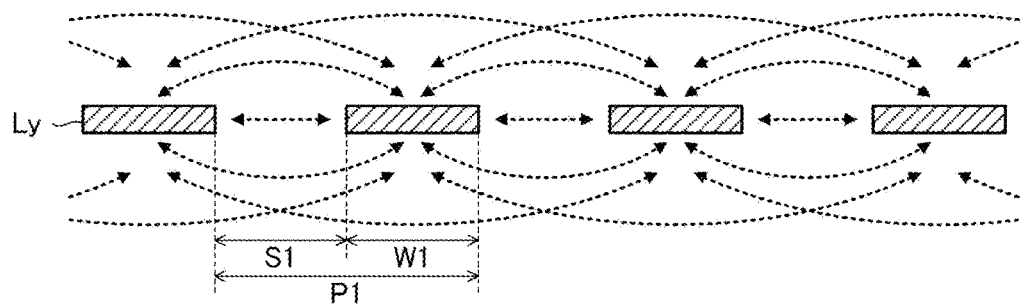
FIGS. 9A and 9B are views illustrating capacitances formed between routing traces Ly.
Figure 9B:
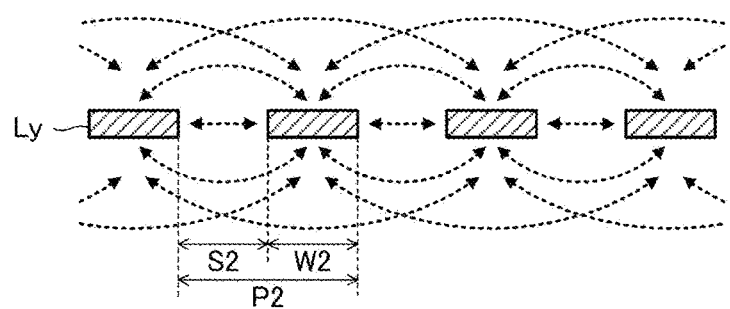

FIG. 9A illustrates a cross section of routing traces Ly extending at the first pitch P1, and FIG. 9B illustrates a cross section of routing traces Ly extending at the second pitch P2. As indicated by the broken lines with arrowheads in FIGS. 9A and 9B, inter-trace capacitances occur between the routing traces Ly that are disposed closely together. Specific values of the inter-trace capacitances may be different when the routing trace pitch is the first pitch P1 and when the routing trace pitch is the second pitch P2. However, by appropriately selecting ratios between routing trace widths and inter-trace space widths, it is possible to equalize the values of the inter-trace capacitances when the routing trace pitch is the first pitch P1 and when the routing trace pitch is the second pitch P2.

Figure 10:
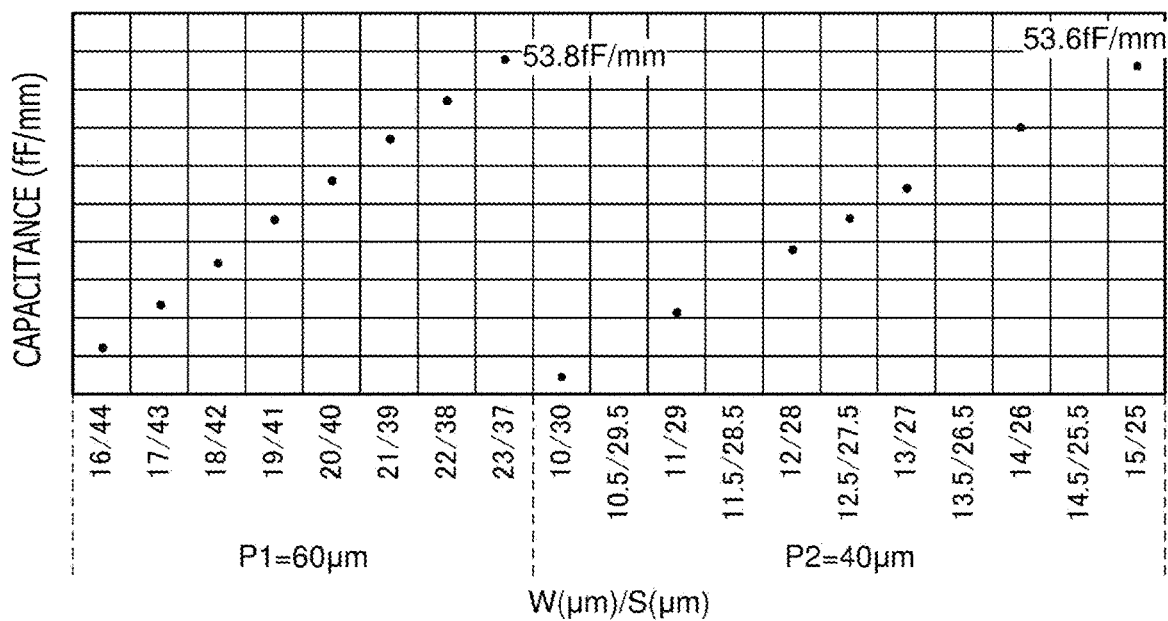
FIG. 10 is a diagram illustrating the relationship between ratios of routing trace widths to inter-trace space widths, and capacitances formed between routing traces.

FIG. 10 is a diagram illustrating the relationship between ratios (W/S) of routing trace widths W and inter-trace space widths S and inter-trace capacitances when the routing trace pitch is the first pitch P1 and when the routing trace pitch is the second pitch P2. In FIG. 10, the first pitch P1 is illustrated as 60 μm and the second pitch P2 as 40 μm.

As illustrated in FIG. 10, the values of inter-trace capacitances increase substantially proportionately to the routing trace width W either when the routing trace pitch is the first pitch P1 or when the routing trace pitch is the second pitch P2. Though the proportionality coefficient is different depending on the pitch, it can be understood from FIG. 10 that the range of values of inter-trace capacitances remains substantially the same irrespectively of the pitch. For example, when the pitch is the first pitch P1 and the routing trace width W is 23 μm, i.e., when the ratio between an routing trace width W1 and an inter-trace space width S1 is 23/37, the inter-trace capacitance is 53.8 fF/mm, and when the pitch is the second pitch P2 and the routing trace width W is 15 μm, i.e., when the ratio between an routing trace width W2 and an inter-trace space width S2 is 15/25, the inter-trace capacitance is 53.6 fF/mm. These inter-trace capacitances are substantially equal to each other. Therefore, if the ratio between the routing trace width W1 and the inter-trace space width S1 in the large-pitch portion where the routing traces are formed at a pitch of 60 μm is 23/37 and the ratio between the routing trace width W2 and the inter-trace space width S2 in the small-pitch portion where the routing traces are formed at a pitch of 40 μm is 15/25, it is possible to make the values of inter-trace capacitances per unit length essentially equal to each other in the large-pitch portion and the small-pitch portion.

The relationship (particularly, the proportionality coefficient) between the ratios between the routing trace width W and the inter-trace space width S, and the values of the inter-trace capacitances, varies depending on the dielectric constants of the adhesive sheets 23 and 25, etc. Therefore, a specific ratio required between the routing trace width W and the inter-trace space width S to make the values of inter-trace capacitances per unit length essentially equal to each other in the large-pitch portion and the small-pitch portion should be checked for each product depending on the materials used and so on.

The third aspect of the present disclosure will be described in detail below. The third aspect is aimed at solving the problem that the accuracy with which to detect the position of the active stylus 10 is lowered in the vicinity of the outer edges of the display area 3a as a result of difficulty in having electrodes extend in the bezel area 3b due to efforts to narrow the bezel of the display panel 3. The third aspect of the present disclosure will be described below with reference to FIGS. 3, 11, and 12.

The problem of the background art that corresponds to the third aspect of the present disclosure will first be described in detail below.

Figure 12A:
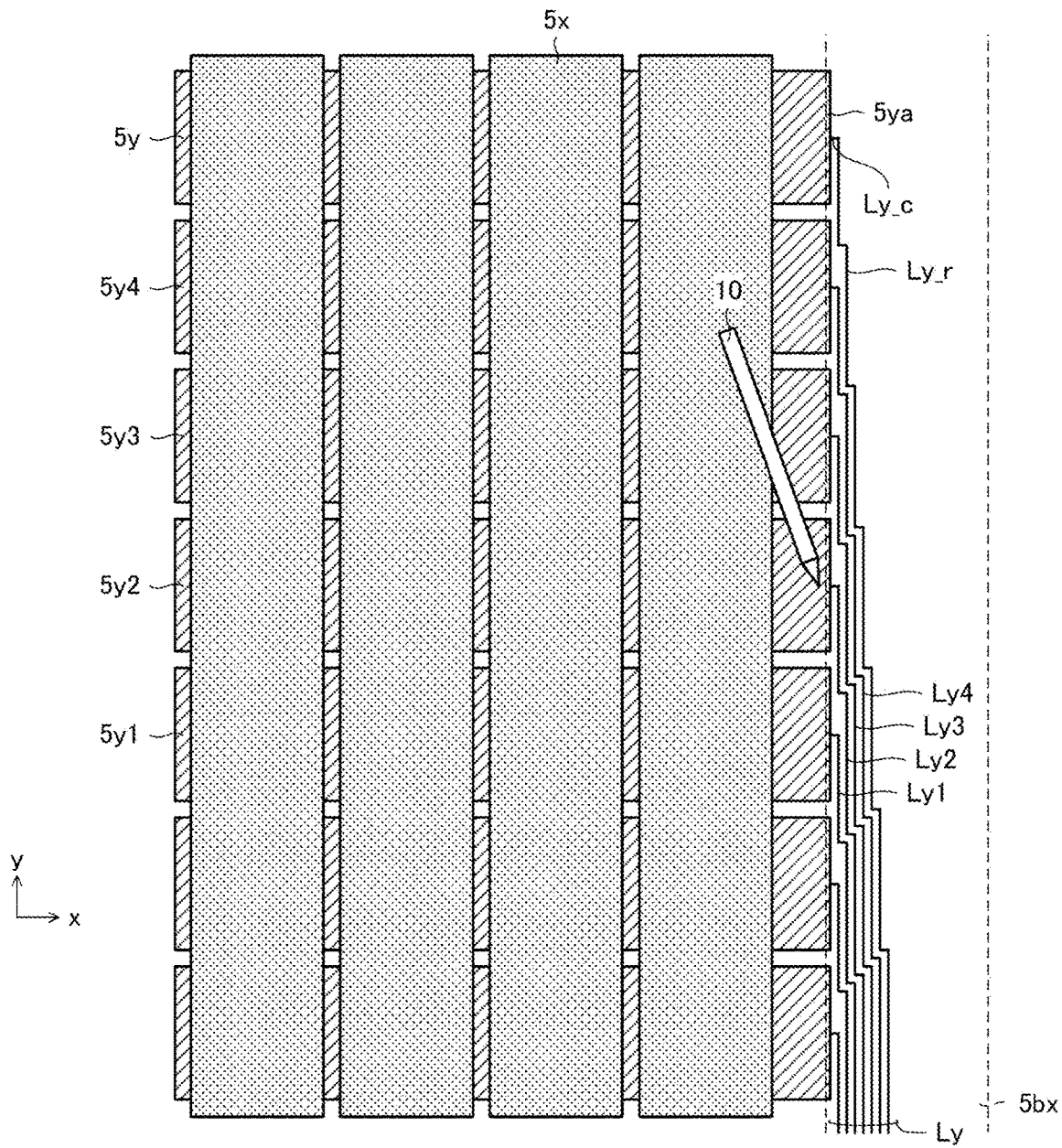
FIG. 12A is an enlarged view of a portion of a sensor panel 5 according to a first aspect of the present disclosure, which is also illustrated in FIG. 4.
Figure 12B:
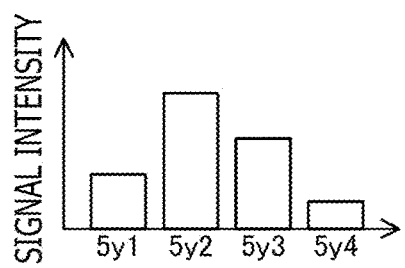
FIG. 12B is a diagram illustrating an inter-electrode signal intensity distribution of the sensor panel 5 depicted in FIG. 12B.

FIG. 12A is an enlarged view of a portion (part of the area 5bx and its neighborhood) of the sensor panel 5 reflecting the first aspect of the present disclosure, which is also illustrated in FIG. 4. FIG. 12B is a diagram illustrating an inter-electrode signal intensity distribution of the sensor panel 5 depicted in FIG. 12A.

As illustrated in FIG. 12A, in the sensor panel 5 according to the background art, the routing traces Ly are connected respectively to the linear electrodes 5y centrally on surfaces 5ya of x-direction ends of the corresponding linear electrodes 5y. The routing traces Ly extend from the surfaces 5ya through trunk lines Ly_c and routing lines Ly_r and are connected to the FPC connection terminals Ty illustrated in FIG. 3. The trunk lines Ly_c extend parallel to the x direction. Linear electrodes 5y1 through 5y4, which are four juxtaposed linear electrodes ty, and routing traces Ly1 through Ly4, which are routing traces Ly corresponding respectively to the linear electrodes 5y1 through 5y4, will be addressed and described below.

FIG. 12B illustrates an inter-electrode signal intensity distribution at the time the stylus tip of the active stylus 10 is close to a central portion in the y direction of the x-direction end of the linear electrode 5y2, as illustrated in FIG. 12A. As illustrated in FIG. 12B, the intensities of stylus signals at the linear electrodes 5y1 through 5y4 are progressively weaker in the order of the linear electrodes 5y2, 5y3, 5y1 and 5y4.

For detecting the y coordinate of the active stylus 10, the sensor controller 4 receives respective stylus signals (more specifically, positional signals included in stylus signals) at a plurality of linear electrodes 5y, rather than one linear electrode, and detects the position indicated by the active stylus 10 based on the received stylus signals. This is so as to detect also the y coordinates between adjacent linear electrodes 5y. Specifically, the sensor controller 4 derives such y coordinates by interpolating the received intensities of stylus signals received respectively by a plurality of linear electrodes 5y according to a predetermined interpolating process. In case the stylus tip of the active stylus 10 is close to a central portion in the y direction of the x-direction end of the linear electrode 5y2, as illustrated in FIG. 12A, it is necessary that the received intensities of stylus signals at the linear electrodes 5y1 and 5y3 be equal to each other for accurately deriving the position of the active stylus 10.

As can be seen from FIG. 12B, however, the received intensities of stylus signals at the linear electrodes 5y1 and 5y3 are not equal to each other. Consequently, the sensor controller 4 is unable to accurately derive the position of the active stylus 10 in the example depicted in FIG. 12A. This results from the fact that the narrowed bezel of the display panel 3 makes it difficult to secure enough room/space for having electrodes 5y extend in the bezel area 3b, and as a consequence the signal intensities include stylus signals received by the routing traces Ly.

According to the third aspect of the present disclosure, such a reduction in the accuracy with which to detect a position is prevented. The structure of the sensor panel 5 according to the third aspect of the present disclosure will hereinafter be described in detail below.

Figure 11A:
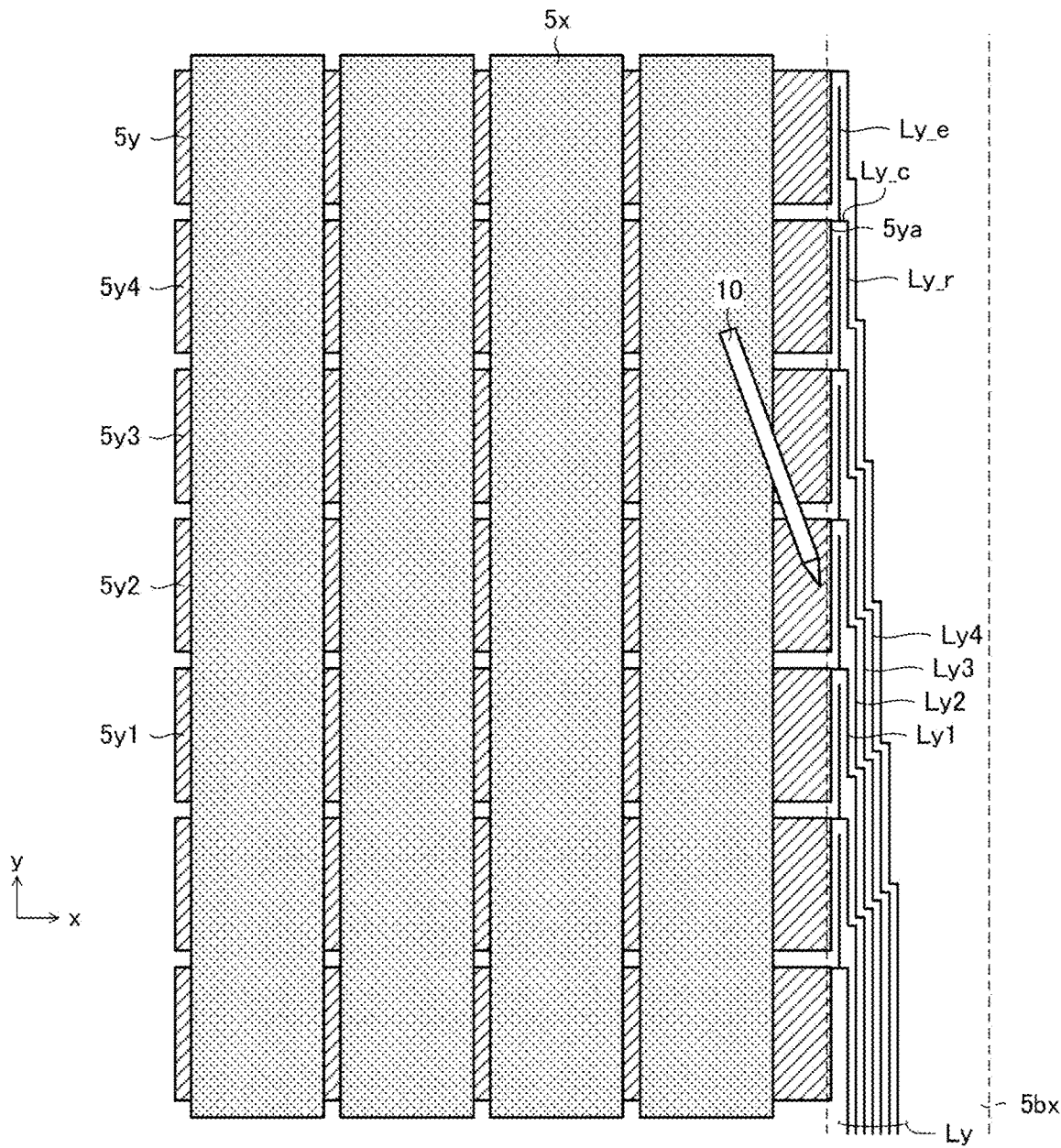
FIG. 11A is an enlarged view of a portion of the sensor panel 5 illustrated in FIG. 1, schematically illustrating the components of the sensor panel 5 depicted in FIG. 3, exclusive of the components according to the second aspect of the present disclosure.
Figure 11B:
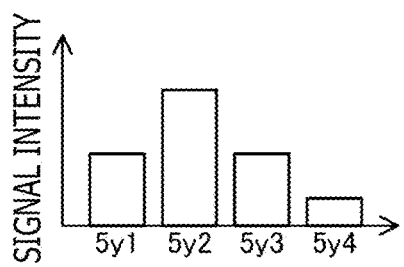
FIG. 11B is a diagram illustrating an inter-electrode signal intensity distribution of the sensor panel 5 depicted in FIG. 11A.

FIG. 11A is an enlarged view of a portion (part of the area 5bx and its neighborhood) of the sensor panel 5 illustrated in FIG. 1, and FIG. 11B is a diagram illustrating an inter-electrode signal intensity distribution of the sensor panel 5 depicted in FIG. 11A. FIG. 11A schematically illustrates the components of the sensor panel 5 depicted in FIG. 1, exclusive of the components according to the second aspect of the present disclosure.

As illustrated in FIG. 11A, the trunk lines Ly_c of the routing traces Ly according to the present embodiment are connected respectively to the linear electrodes 5y at end portions, remote (distanced away) from the FPC connection terminals Ty, of the surfaces 5ya of the x-direction ends of the linear electrodes 5y. The routing traces Ly according to the present embodiment have extension lines Ly_e extending from the junctions to the corresponding linear electrodes 5y into areas farther away from the FPC connection terminals Ty as viewed in the y direction. Each of the extension lines Ly_e is of a straight shape extending in the y direction and projects centrally from the corresponding trunk line Ly_c. The length of each extension line Ly_e is set such that it overlaps another linear electrode 5y adjacent to the corresponding linear electrode 5y as viewed in the x direction. As illustrated in FIG. 11A, the routing trace Ly which is farthest away from the FPC connection terminals Ty may be free of an extension line Ly_e.

The inter-electrode signal intensity distribution illustrated in FIG. 11B is obtained at the time the stylus tip of the active stylus 10 is close to a central portion in the y direction of the x-direction end of the linear electrode 5y2, as with the example illustrated in FIG. 12B. As illustrated in FIG. 11B, in the sensor panel 5 according to the present embodiment, the received intensities of stylus signals at the linear electrodes 5y1 and 5y3 are substantially of the same value. This is because since the routing traces Ly are of the above structure, the signal received by the routing trace Ly1 increases and the signal received by the routing trace Ly3 decreases. As a result of the equalization of the received intensities of the stylus signals at the linear electrodes 5y1 and 5y3, the accuracy with which to detect the position of the active stylus 10 is increased in the vicinity of the outer edges of the display area 3a, compared with the background art illustrated in FIG. 12. Consequently, it is possible to solve or alleviate the problem that the accuracy with which to detect the position of the active stylus 10 is lowered in the vicinity of the outer edges of the display area 3a due to the narrowed bezel of the display panel 3.

Though only the routing traces Ly are illustrated in FIGS. 11 and 12, the third aspect of the present disclosure is also applicable to the routing traces Lx. Specifically, as illustrated in FIG. 3, the trunk lines of the routing traces Lx according to the present embodiment are connected respectively to the linear electrodes 5x at end portions, away (distanced) from the FPC connection terminals Tx, of the surfaces of the y-direction ends of the linear electrodes 5x. The routing traces Lx according to the present embodiment have extension lines extending from the junctions to the corresponding linear electrodes 5x into areas farther away from the FPC connection terminals Tx as viewed in the x direction. Each of the extension lines is of a straight shape extending in the x direction and projects centrally from the corresponding trunk line. The length of each extension line is set such that it overlaps another linear electrode $5x$ adjacent to the corresponding linear electrode $5x$ as viewed in the y direction. As illustrated in FIG. 3, the routing trace Lx which is the farthest away from the FPC connection terminals Tx may be free of an extension line.

Since the routing traces Lx are of the above structure, the accuracy with which to detect the position of the active stylus 10 is increased in the vicinity of the outer edges of the display area $3a$, in the same manner as described above, when the stylus tip of the active stylus 10 is close to a central portion in the x direction of the y-direction end of one of the linear electrodes $5x$.

According to the third aspect of the present disclosure, as described above, even when the active stylus 10 is in the vicinity of an outer edge of the display area $3a$ and stylus signals received by not only the linear electrodes $5x$ and $5y$ but also the routing traces Lx and Ly are used for positional detection, it is possible to obtain an inter-electrode signal intensity distribution that is equivalent to the inter-electrode signal intensity distribution obtained when stylus signals are received by only the linear electrodes $5x$ and $5y$. Accordingly, it is possible to solve or alleviate the problem that the accuracy with which to detect the position of the active stylus 10 is lowered in the vicinity of the outer edges of the display area $3a$ due to the narrowed bezel of the display panel 3.

In FIGS. 11A and 11B, the sensor panel 5 according to the first aspect of the present disclosure to which the structure according to the third aspect of the present disclosure is added is illustrated. However, the structure according to the third aspect of the present disclosure may be achieved by adding extension lines to a sensor panel 5 which does not have the structure according to the first aspect.

Figure 13:
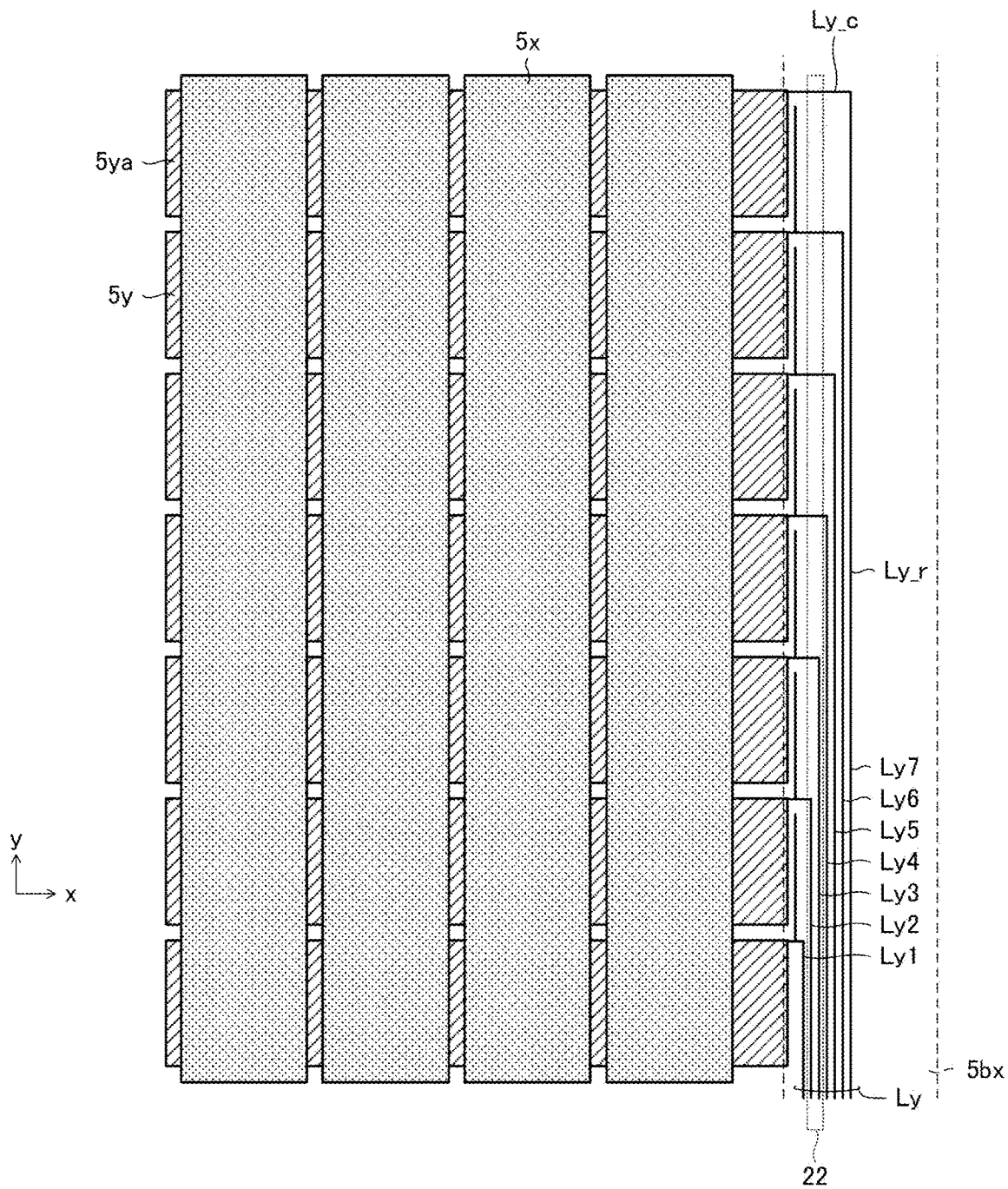
FIG. 13 is an enlarged view of a portion of a sensor panel 5 according to the background art of the present disclosure to which the structure according to the third aspect of the present disclosure is added.

For example, FIG. 13 is an enlarged view of a portion of a sensor panel 5 according to the background art of the present disclosure illustrated in FIG. 5 to which the structure according to the third aspect of the present disclosure is added. As illustrated in FIG. 13, the third aspect of the present disclosure is also applicable to a sensor panel 5 according to the background art where the lengths of the trunk lines Ly_c are not constant.

Specific shapes of the routing traces Lx and Ly that are required to achieve the above advantages are not limited to the shapes illustrated in FIGS. 3, 11, and 13.

Figure 14:
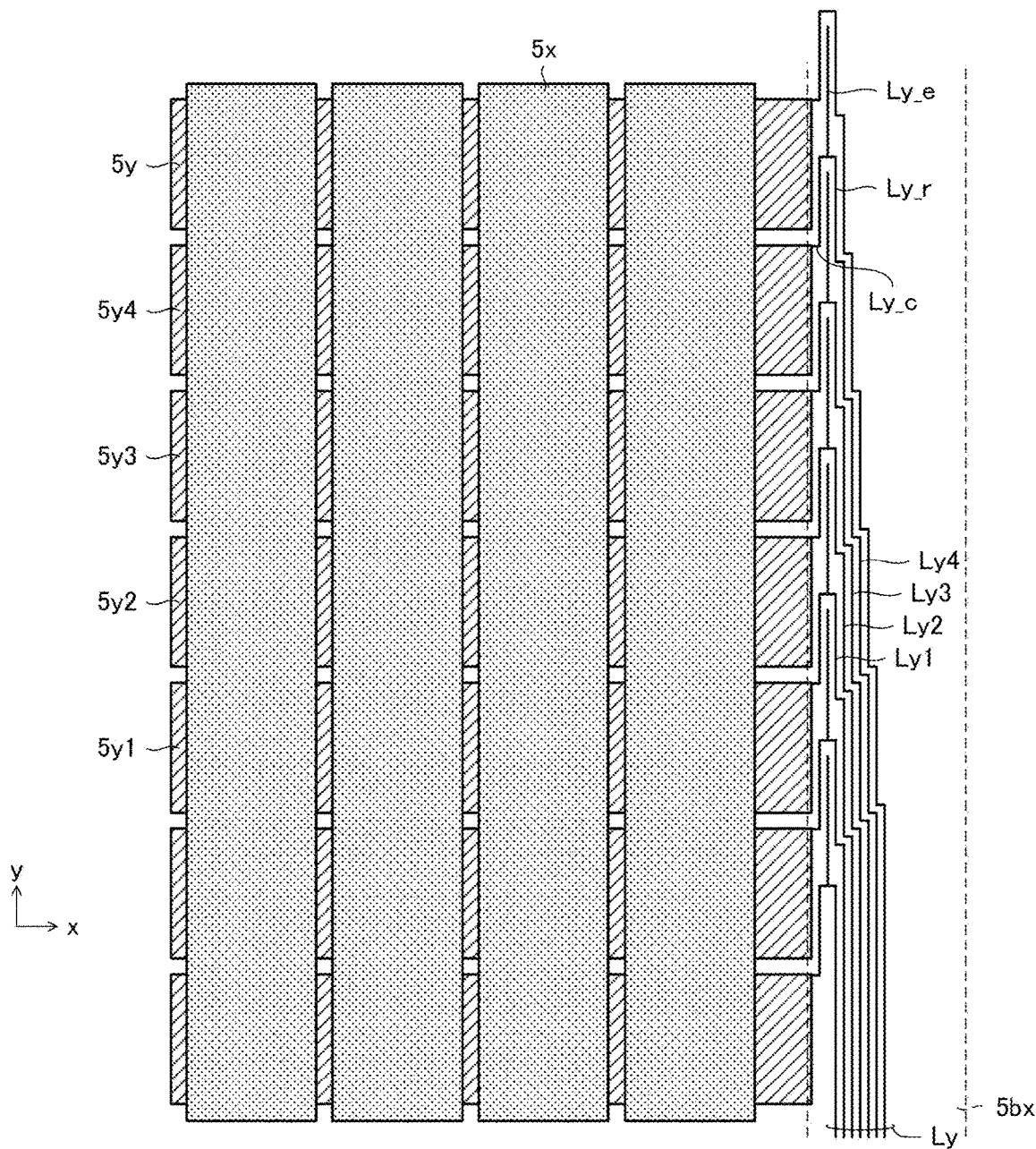
FIG. 14 is an enlarged view of a portion of a sensor panel 5 according to a third modification of the present embodiment.

For example, FIG. 14 is an enlarged view of a portion of a sensor panel 5 according to a third modification of the present embodiment. In the example illustrated in FIG. 14, each extension line Ly_e overlaps another linear electrode $5y$ as viewed in the x direction, wherein the another linear electrode is the second neighboring linear electrode $5y$ of the corresponding linear electrode $5y$, e.g., a linear electrode $5y4$ that is the second neighboring linear electrode $5y$ from the corresponding linear electrode $5y2$. More specifically, the routing line Ly_r of each routing trace Ly extends from the trunk line Ly_c into an area farther away from the FPC connection terminals Ty by making a detouring line in that area, and each extension line Ly_e extends from the detouring routing line Ly_r into an area farther away from the FPC connection terminals Ty. The junction between the extension line Ly_e and the other portion of the routing trace Ly is located at a position on the routing line Ly_r which is the farthest away from the FPC connection terminals Ty in the y direction. The extensions Ly_e and the routing lines Ly_r thus arranged make it possible to solve or alleviate the problem that the accuracy with which to detect the position of the active stylus 10 is lowered in the vicinity of the outer edges of the display area $3a$ due to the narrowed bezel of the display panel 3. The structure illustrated in FIG. 14 is also applicable to the routing traces Lx.

While the preferred embodiments of the present disclosure haves been described above, the present disclosure is not limited to the illustrated embodiments, but may be reduced to practice in various modes without departing from the scope thereof.

For example, as mentioned in the above embodiment, the sensor panel according to the present disclosure may be constructed in a manner to satisfy one, two, or all of the first through third aspects of the present disclosure, and any of sensor panels thus constructed is covered by the technical scope of the present disclosure.

The routing lines need not lie in the same plane as the corresponding linear electrodes, but may extend on curved surfaces along the shape of the bezel or may be oriented at angles.

The present disclosure may include exceptions based on the structures of the bezel, the liquid crystal panel, and so on. For example, with respect to the first aspect of the present disclosure, the lengths of the trunk lines associated with all the linear electrodes need not be of equal lengths, but the trunk lines may include trunk lines that are of different lengths from the other trunk lines due to structural or electrical limitations.

DESCRIPTION OF REFERENCE SYMBOLS

1 . . . Electronic device, 2 . . . Host controller, 3 . . . Display panel, $3a$ . . . Display area, $3b$ . . . Bezel area, 4 . . . Sensor controller, 5 . . . Sensor panel, $5a$ . . . Detection area, $5b$ . . . Routing trace area, $5bx$ . . . Area in the routing trace area $5b$ that is adjacent to the detection area $5a$ in the x direction, $5by$ . . . Area in the routing trace area $5b$ that is adjacent to the detection area $5a$ in the y direction, $5x$, $5y$ . . . Linear electrode, 10 . . . Active stylus, 21 . . . Liquid crystal module, 22 . . . Metal frame, 23 . . . Adhesive sheet, 24 . . . Film, 25 . . . Adhesive sheet, 26 . . . Cover glass sheet, $26a$ . . . Touch surface, LG . . . Guard trace, Lx, Ly . . . routing trace, Ly_c . . . Trunk line of the routing trace Ly, Ly_e . . . Extension line of the routing trace Ly, Ly_r . . . Routing line of the routing trace Ly, T, Tx, Ty, TG . . . FPC connection terminal.

The invention claimed is:

1. A sensor panel including a detection area and coupleable to an integrated circuit (IC) for detecting a position of an active stylus in the detection area, the sensor panel comprising:

a plurality of first electrodes which are elongated and extending along a first direction in the detection area, wherein the plurality of first electrodes are arrayed along a second direction that is transverse to the first direction;

a plurality of first routing traces associated respectively with the first electrodes and connected respectively to the first electrodes; and a plurality of first terminals associated respectively with the first routing traces and connecting the first routing traces to the IC, wherein the first routing traces include extension lines, the extension line of the first routing trace is formed in an area at a first distance from the first terminals along the second direction, and a junction between the first routing trace and the first electrodes relative to electrode is at a second distance from the first terminals along the second direction, which is less than the first distance.

2. The sensor panel according to claim 1, wherein the extension lines include straight portions extending along the second direction.

3. The sensor panel according to claim 1, further comprising:
a plurality of second electrodes which are elongated and extending along the second direction in the detection area, wherein the plurality of second electrodes are arrayed along the first direction;
a plurality of second routing traces associated respectively with the second electrodes and connected respectively to the second electrodes; and
a plurality of second terminals associated respectively with the second routing traces and connecting the second routing traces to the IC,
wherein
the second routing traces include extension lines, the extension line of the second routing trace is formed in an area at a third distance from the second terminals along the first direction, and a junction between the second routing trace and the second electrode is at a fourth distance from the second terminals along the first direction, which is less than the third distance.

4. A sensor panel including a detection area and coupleable to an integrated circuit (IC) for detecting a position of an active stylus in the detection area, the sensor panel comprising:
a plurality of first electrodes which are elongated and extending along a first direction in the detection area, wherein the plurality of first electrodes are arrayed along a second direction that is transverse to the first direction;
a plurality of first routing traces associated respectively with the first electrodes and connected respectively to the first electrodes; and
a plurality of first terminals associated respectively with the first routing traces and connecting the first routing traces to the IC,
wherein
the first routing traces have first routing lines respectively connected at an angle, which is not zero degrees, to first trunk lines that are directly connected to the first electrodes,
the first trunk lines corresponding to the first routing traces have substantially equal lengths,
the first routing traces have a large-pitch portion in which the first routing traces are arrayed at a first pitch and a small-pitch portion in which the first routing traces are arrayed at a second pitch smaller than the first pitch, wherein the large-pitch portion and the small-pitch portion are provided in a first routing trace area located adjacent to the detection area along the first direction, and
the first routing traces include extension lines, the extension line of the first routing trace is formed in an area at a first distance from the first terminals along the second direction, and a junction between the first routing trace and the first electrode is at a second distance from the first terminals along the second direction, which is less than the first distance.

* * * * *